United States Patent
Qiu et al.

(10) Patent No.: US 11,491,400 B2
(45) Date of Patent: Nov. 8, 2022

(54) METHOD, APPARATUS, AND DEVICE FOR SCHEDULING VIRTUAL OBJECTS IN VIRTUAL ENVIRONMENT

(71) Applicant: Tencent Technology (Shenzhen) Company Limited, Shenzhen (CN)

(72) Inventors: Fuhao Qiu, Shenzhen (CN); Bin Wu, Shenzhen (CN); Peng Qu, Shenzhen (CN); Xiaoqian Li, Shenzhen (CN); Jing Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 4 days.

(21) Appl. No.: 17/185,812

(22) Filed: Feb. 25, 2021

(65) Prior Publication Data

US 2021/0178271 A1    Jun. 17, 2021

Related U.S. Application Data

(63) Continuation of application No. PCT/CN2019/117391, filed on Nov. 12, 2019.

(51) Int. Cl.
*A63F 13/58* (2014.01)
*G06V 10/40* (2022.01)

(52) U.S. Cl.
CPC .............. *A63F 13/58* (2014.09); *G06V 10/40* (2022.01)

(58) Field of Classification Search
None
See application file for complete search history.

(56) References Cited

U.S. PATENT DOCUMENTS 7,813,822 B1 * 10/2010 Hoffberg ............... H04N 7/163
                                                        381/73.1
2018/0256981 A1    9/2018 Enomoto

FOREIGN PATENT DOCUMENTS

| CN | 107103644 A | 8/2017 |
| CN | 108283809 A | 7/2018 |
| CN | 108499107 A | 9/2018 |

(Continued)

OTHER PUBLICATIONS

Tencent Technology, ISR, PCT/CN2019/117391, Jan. 23, 2020, 2 pgs.

(Continued)

*Primary Examiner* — Kevin Y Kim
(74) *Attorney, Agent, or Firm* — Morgan, Lewis & Bockius LLP

(57) ABSTRACT

This application discloses a method, an apparatus, and a device for scheduling virtual objects in a virtual environment, which relate to artificial intelligence (AI), and belong to the field of computer technologies. The method includes: obtaining frame data generated by an application program associated with the virtual environment; performing feature extraction on the frame data to obtain a state feature of a target virtual object; performing deduction on the state feature of the target virtual object according to N scheduling policies; invoking a value network prediction model to process the N subsequent state features, to obtain expected returns of executing N scheduling policies; and controlling the target virtual object to execute a scheduling policy having a highest expected return.

20 Claims, 12 Drawing Sheets

(56) References Cited

FOREIGN PATENT DOCUMENTS

| | | |
|---|---|---|
| CN | 109471712 A | 3/2019 |
| JP | 2018171427 A | 11/2018 |

OTHER PUBLICATIONS

Tencent Technology, WO, PCT/CN2019/117391, Jan. 23, 2020, 4 pgs.
Tencent Technology, IPRP, PCT/CN2019/117391, May 25, 2021, 5 pgs.

* cited by examiner

METHOD, APPARATUS, AND DEVICE FOR SCHEDULING VIRTUAL OBJECTS IN VIRTUAL ENVIRONMENT

CROSS REFERENCE TO RELATED APPLICATIONS

This application is a continuation application of PCT Patent Application No. PCT/CN2019/117391, entitled "METHOD, APPARATUS AND DEVICE FOR SCHEDULING VIRTUAL OBJECT IN VIRTUAL. ENVIRONMENT" filed on Nov. 12, 2019, which claims priority to Chinese Patent Application No. 201811393388.0, filed with the State Intellectual Property Office of the People's Republic of China on Nov. 21, 2018, and entitled "METHOD, APPARATUS, AND DEVICE FOR SCHEDULING VIRTUAL OBJECTS IN VIRTUAL ENVIRONMENT", all of which are incorporated herein by reference in their entirety.

FIELD OF THE TECHNOLOGY

This application relates to the field of computer technologies, and in particular, to a method, an apparatus, and a device for scheduling virtual objects in a virtual environment.

BACKGROUND OF THE DISCLOSURE

Artificial intelligence (AI) is a computer program system that reacts in a way of human thinking and executes a corresponding behavior. AI is widely applied to fields such as image recognition, voice recognition, natural language processing, and expert systems. The expert system is AI that simulates human experts to resolve domain problems, for example, the AI Alphago, which simulates a Go player to play Go.

On terminals such as a smartphone and a tablet computer, there are many application programs with two-dimensional or three-dimensional virtual environments, such as: a multiplayer online battle arena (MOBA) game and a simulation game (SLG). In the foregoing application program, a user can control a virtual object (such as a virtual character) to execute a scheduling policy to win. When the user cannot control the virtual object for some reason, the user needs to rely on AI to assist in executing the corresponding scheduling policy.

A situation-state space in a virtual environment is much larger than that of Go, and executable behaviors of virtual objects are continuous and diverse. For example, a size of a map in the MOBA game is about 50,000×50,000 pixels, including more than 60 different types of operable units. Each operable unit has continuity and diversity. Therefore, it is difficult for AI to derive a state of the virtual environment, causing relatively low accuracy of AI in determining a scheduling policy.

SUMMARY

According to various embodiments provided in this application, a method, an apparatus, and a device for scheduling virtual objects in a virtual environment are provided.

According to an aspect, an embodiment of this application provides a method for scheduling virtual objects in a virtual environment, performed by a computer device, the virtual environment including at least two virtual objects and virtual resources available to the virtual objects. The method includes:

obtaining frame data generated by an application program associated with the virtual environment;

performing feature extraction on the frame data to obtain a state feature of a target virtual object in a current state, the state feature including states of associated virtual objects and the virtual resources, the associated virtual objects including the target virtual object and a virtual object having a relationship with the target virtual object;

performing deduction on the state feature of the target virtual object according to N scheduling policies, to obtain N subsequent state features, N being a positive integer greater than or equal to 2;

invoking a value network prediction model to process the N subsequent state features, to obtain expected returns of executing the N scheduling policies by the target virtual object; and controlling the target virtual object to execute a scheduling policy having a highest expected return in the N scheduling policies.

According to an aspect, an embodiment of this application provides an apparatus for scheduling virtual objects in a virtual environment, the virtual environment including at least two virtual objects and virtual resources available to the virtual objects. The apparatus includes:

a data obtaining module, configured to obtain frame data generated by an application program associated with the virtual environment;

a feature extraction module, configured to perform feature extraction on the frame data to obtain a state feature of a target virtual object in a current state, the state feature including states of associated virtual objects and the virtual resources, the associated virtual objects including the target virtual object and a virtual object having a relationship with the target virtual object;

a state deduction module, configured to perform deduction on the state feature of the target virtual object according to N scheduling policies, to obtain N subsequent state features, N being a positive integer greater than or equal to 2;

a value assessment module, configured to invoke a value network prediction model to process the N subsequent state features, to obtain expected returns of executing the N scheduling policies by the target virtual object; and a control module, configured to control the target virtual object to execute a scheduling policy having a highest expected return in the N scheduling policies.

According to an aspect, an embodiment of this application provides a computer device, including: a memory and a processor, the memory storing computer-readable instructions, and the computer-readable instructions, when executed by the processor, causing the processor to perform the method for scheduling virtual objects in a virtual environment.

According to an aspect, an embodiment of this application provides one or more non-transitory storage media storing computer-readable instructions, the computer-readable instructions, when executed by one or more processors, causing the one or more processors to perform the method for scheduling virtual objects in a virtual environment.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions in the embodiments of this application more clearly, the accompanying drawings required for describing the embodiments are briefly described below. Apparently, the accompanying drawings in the following description show only some embodiments. Apparently, the accompanying drawings in the following description show merely some embodiments of this application, and a person of ordinary skill in the art may still derive other drawings from the accompanying drawings without creative efforts.

DESCRIPTION OF EMBODIMENTS

Figure 1:
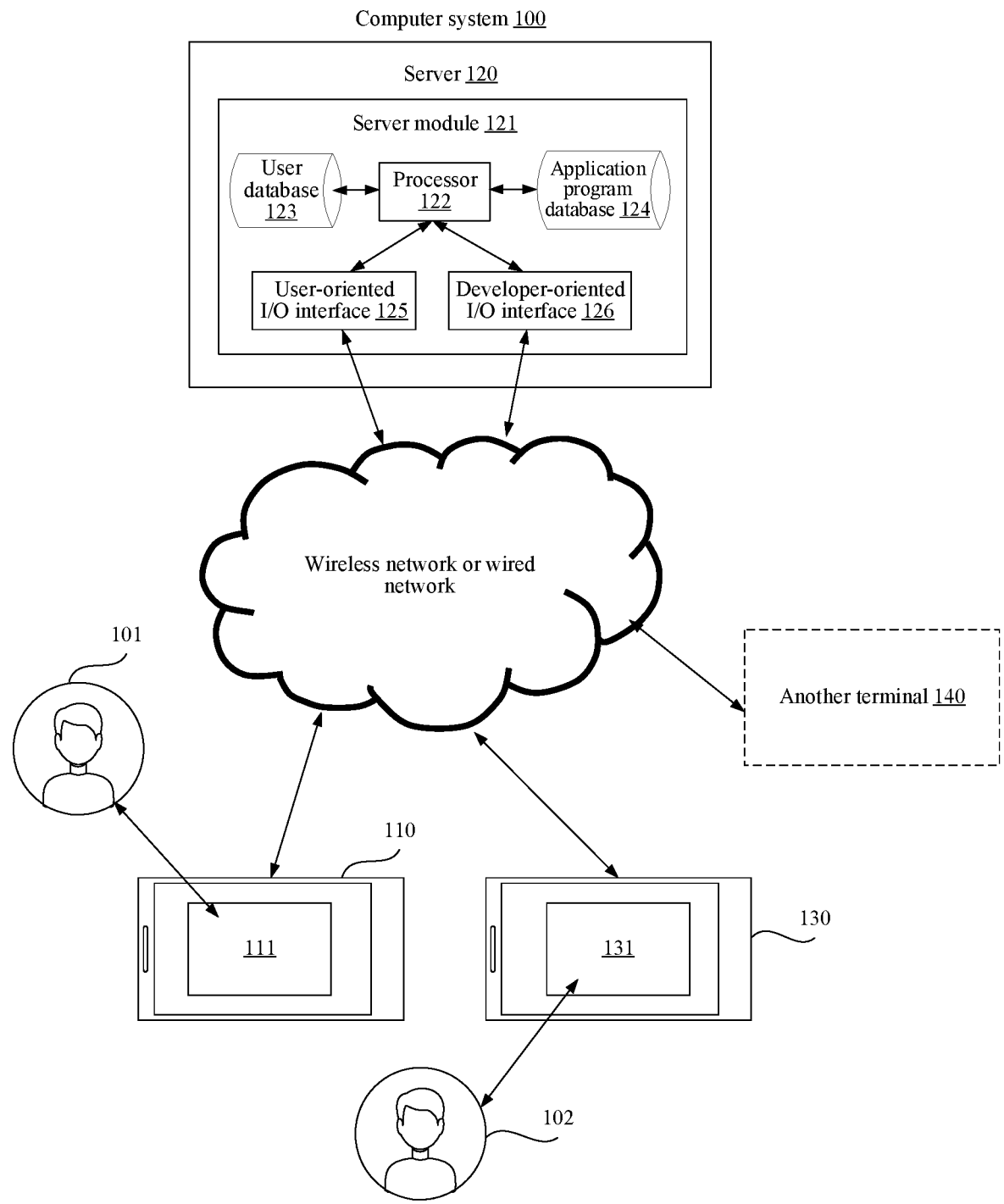
FIG. 1 is a structural block diagram of a computer system according to some exemplary embodiments of this application.

To make the objectives, technical solutions, and advantages of this application clearer, implementations of this application are further described below in detail with reference to the accompanying drawings.

First, terms involved in the embodiments of this application are introduced:

Virtual environment: It is a virtual environment displayed (or provided) by an application program when run on a terminal. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment. In some embodiments, the virtual environment is further used for a virtual environment battle between at least two virtual roles, and there are virtual resources available to the at least two virtual roles in the virtual environment. Optionally, a map of the virtual environment is a square or a rectangle, and the square or rectangle includes a lower left diagonal region and an upper right diagonal region that are symmetrical; a winning condition of the battle in the virtual environment includes occupying or destroying target strongholds of an enemy camp. The target strongholds may be all strongholds of the enemy camp, or some of the strongholds (such as a main base and a defensive tower) of the enemy camp.

Virtual object: It refers to a movable object in the virtual environment. The movable object may be at least one of a virtual character, a virtual animal, and a cartoon character. In some embodiments, when the virtual environment is a three-dimensional virtual environment, the virtual objects are three-dimensional models. Each virtual object has a shape and a volume in the three-dimensional virtual environment, and occupies some space in the three-dimensional virtual environment. Optionally, the virtual object may be a hero, a soldier, or a neutral creature in a MOBA game. In the embodiments of this application, a description is made by using an example in which a target virtual object is a hero.

MOBA game: It is a game in which several strongholds are provided in a virtual environment, and users control virtual objects belonging to different camps to battle in the virtual environment, occupy strongholds or destroy enemy camp strongholds. For example, in a MOBA game, virtual objects may be divided into two hostile camps, scattered in a virtual environment to compete with each other, and destroying or occupying all enemy strongholds is used as a winning condition. The MOBA game uses round as a unit. A duration of a round of the MOBA game is from a time point at which the game starts to a time point at which the winning condition is met.

Scheduling policy: It is a behavior of determining that a virtual object moves to a target region and executing a corresponding task in the target region. For example, a large-scale transfer is performed on virtual objects defending in a region A to a region B for a local battle with virtual objects of an enemy camp, to obtain better rewards. Generally, the scheduling policy has a relatively high requirement on an overall view of a user.

Frame data: It is data generated by an application program of a virtual environment during running. Because a user interface of the virtual environment is displayed by using a frame as a unit, the data generated by the application program during running is also in units of frames, and is thus referred to as frame data. The frame data includes frame data corresponding to each virtual object in the virtual environment, and the frame data corresponding to the virtual object is data used for generating a user interface corresponding to the virtual object. The application program being a MOBA game is used as an example. When a terminal A that controls a virtual object A is running a MOBA game, a frame of game picture (that is, a user interface) corresponding to the virtual object A is displayed at a particular time interval, and data corresponding to each frame of game picture is frame data corresponding to the virtual object A.

Reward: It is an overall contribution from a scheduling policy and/or behavior of a virtual object to a winning condition. A contribution from the behavior of the virtual object to the winning condition is an instant reward, and a contribution from the scheduling policy of the virtual object to the winning condition is a return. For example, the virtual object is defending in a region A, and the behavior of the virtual object is attacking a virtual animal. A contribution from an increase in an empirical value caused by the attack on the virtual animal to the winning condition is an instant reward of the virtual object A. A user controls the virtual object to be transferred, in a large-scale manner, from the region A to a region B, to have a local battle with virtual objects of an enemy camp. A contribution from the virtual object to the winning condition by killing virtual objects in the enemy camp is a return.

A value network model (value network) is obtained in the following manner: calculating, according to a state feature and a battle result of the application program of the virtual environment in each situation state, a contribution from each state feature to a winning condition, to obtain a return of the state feature, thereby obtaining a data set of a large quantity of state feature-return sample pairs, and obtaining, through a supervised deep learning model by using the data set of the state feature-return sample pairs, a machine learning model for predicting a return corresponding to the state feature.

A machine learning model is an operational model including a large quantity of nodes (or referred to as neurons) connected to each other, each node corresponding to one policy function. A connection between each two nodes represents a weighted value of a signal passing through the connection, the weighted value being referred to as a weight. After a sample is inputted into a node of the machine learning model, an output result is outputted by each node, and the output result is used as an input sample for a next node. The machine learning model adjusts a policy function and a weight of each node by using a final output result of the sample. This process is referred to as training.

The method provided in the embodiments of this application is applicable to scheduling virtual objects in a virtual environment. A deduction method may be used to perform deduction on a situation state of the virtual environment. The deduction method may also be applicable to deduction of Go. Simulation and deduction may be performed on a current state of Go according to all executable subsequent move behaviors until the end of a round, so as to obtain final probabilities of winning and losing of each subsequent move behavior, and then accurately determine an optimal move policy. Because Go can be represented by using a two-dimensional space of 19×19, situation states of Go are discrete finite states. In addition, there are about 150 rounds on average in one Go game, and the transition between situation states may be uniquely determined according to a move behavior. Therefore, the deduction of the situation state of Go can be implemented based on discrete state spaces and behavior spaces, and limited quantity of rounds.

For the virtual environment, for example, on terminals such as a smartphone and a tablet computer, there are many application programs with two-dimensional or three-dimensional virtual environments, such as: a MOBA game and an SLG. In the foregoing application program, a user can control a virtual object (such as a virtual character) to execute a scheduling policy to win. When a user cannot control a virtual object for some reason, the user may rely on AI to assist in executing a corresponding scheduling policy. Before the AI executes the scheduling policy, deduction may be performed on the current state by using the method provided in the embodiments of this application, so as to determine an optimal scheduling policy.

AI is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand the essence of intelligence and produces a new intelligent machine that responds in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level and software-level technologies. The basic AI technology generally includes technologies such as sensors, dedicated AI chips, cloud computing, distributed storage, a big data processing technology, an operating/interaction system, and electromechanical integration. AI software technologies mainly include several major directions such as a computer vision technology, a speech processing technology, a natural language processing technology, and machine learning/deep learning.

Computer vision (CV) is a science that studies how to enable a machine to "see", and to be specific, to implement machine vision such as recognition, tracking, measurement, and the like for a target by using a camera and a computer in replacement of human eyes, and further perform graphic processing, so that the computer processes the target into an image more suitable for human eyes to observe, or more suitable to be transmitted to an instrument for detection. As a scientific subject, CV studies related theories and technologies, and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

Machine learning (ML) is a multi-field interdisciplinary, and relates to a plurality of disciplines such as the probability theory, statistics, the approximation theory, convex analysis, and the algorithm complexity theory. The machine learning specializes in studying how a computer simulates or implements a human learning behavior to obtain new knowledge or skills, and reorganize an existing knowledge structure, so as to keep improving performance of the computer. The machine learning, as the core of AI, is a basic way to make the computer intelligent, and is applicable to various fields of AI. The machine learning and deep learning generally include technologies such as an artificial neural network, a belief network, reinforcement learning, transfer learning, inductive learning, and learning from demonstrations.

With the research and progress of the AI technology, the AI technology is studied and applied to a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this application relate technologies such as ML of AI, and are specifically described by using the following embodiments.

FIG. 1 is a structural block diagram of a computer system according to some exemplary embodiments of this application. A network access system 100 includes: a first terminal 110, a second terminal 130, and a server 120.

An application program supporting a virtual environment is installed and run on the first terminal 110. When the first terminal runs the application program, a user interface 111 of the application program is displayed on a screen of the first terminal. The application program may be any one of a military simulation program, a MOBA game, or an SLG. The first terminal 110 is a terminal used by a first user 101, and the first user 101 uses the first terminal 110 to control a first virtual object located in the virtual environment to perform a movement. The movement includes, but is not limited to, at least one of body posture adjustment, crawling, walking, running, cycling, jumping, driving, picking-up, shooting, attacking, and throwing. For example, the first virtual object is a first virtual character, such as a simulated character role or a cartoon character role.

An application program supporting a virtual environment is installed and run on the second terminal 130. The application program may be any one of a military simulation program, a MOBA game, or an SLG. When the second terminal runs the application program, a user interface 131 of the application program is displayed on a screen of the second terminal. The second terminal 130 is a terminal used by a second user 102, and the second user 102 uses the second terminal 130 to control a second virtual object located in the virtual environment to perform a movement. For example, the second virtual object is a second virtual character, such as a simulated character role or a cartoon character role.

In some embodiments, the first virtual character and the second virtual character are located in the same virtual environment. In some embodiments, the first virtual character and the second virtual character may belong to the same camp, the same team, or the same organization, have a friend relationship, or have a temporary communication permission. Optionally, the first virtual character and the second virtual character may belong to different camps, different teams, or different organizations, or have a hostile relationship with each other.

In some embodiments, the application programs installed on the first terminal 110 and the second terminal 130 are the same, or the application programs installed on the two terminals are the same type of application programs in different control system platforms. The first terminal 110 may generally refer to one of a plurality of terminals, and the second terminal 130 may generally refer to one of a plurality of terminals. In this embodiment, only the first terminal 110 and the second terminal 130 are used as an example for description. The first terminal 110 and the second terminal 130 are of the same or different device types, the device type including at least one of a smartphone, a tablet computer, an e-book reader, an MP3 player, an MP4 player, a laptop portable computer, and a desktop computer.

Another terminal 140 may be a terminal corresponding to a developer. A developing and editing platform for the application program of the virtual environment is installed on the terminal 140. The developer can edit the application program on the terminal 140 and transmit an edited application program file to the server 120 through a wired or wireless network. The first terminal 110 and the second terminal 130 can download an update package corresponding to the application program from the server 120 to update the application program.

The first terminal 110, the second terminal 130, and the another terminal 140 are connected to the server 120 through a wireless network or a wired network.

The server 120 includes at least one of one server, a plurality of servers, a cloud computing platform, and a virtualization center. The server 120 is configured to provide background services for an application program supporting a three-dimensional virtual environment. In some embodiments, the server 120 takes on primary computing work, and the terminals take on secondary computing work; alternatively, the server 120 takes on secondary computing work, and the terminals take on primary computing work; alternatively, collaborative computing is performed by using a distributed computing architecture between the server 120 and the terminals.

The server 120 includes at least one server module 121. The server module 121 includes a processor 122, a user database 123, an application program database 124, a user-oriented input/output (I/O) interface 125, and a developer-oriented I/O interface 126. The processor 122 is configured to load instructions stored in the server module 121, and process data in the user database 123 and the application program database 124; the user database 123 is configured to store user data uploaded by the first terminal 110 and/or the second terminal 130 through a wireless network or wired network; the application program database 124 is configured to store data in the application program of the virtual environment; the user-oriented I/O interface 125 is configured to establish communication and exchange data with the first terminal 110 and/or the second terminal 130 through a wireless network or wired network; and the developer-oriented I/O interface 126 is configured to establish communication and exchange data with the another terminals 140 through a wireless network or wired network.

In a scenario in which the AI assists the user in controlling scheduling of a target virtual object, the first user 101 uses the first terminal 110 to control the first virtual object located in the virtual environment to perform a movement. When it is inconvenient for the user to control the first virtual object, the user may enable an AI auxiliary control function in the application program. After receiving a signal that the AI auxiliary function is enabled, the server 120 schedules the first virtual object.

In a scenario in which AI controls a target virtual object to battle with the user, the server 120 controls the first virtual object located in the virtual environment to perform a movement, and the second user 102 uses the second terminal 130 to control the second virtual object located in the same virtual environment to perform a movement.

In a scenario in which AI controls at least one virtual object to battle in a virtual environment, the server 120 controls a plurality of virtual objects located in the virtual environment to battle. In this application scenario, the first terminal 110 and the second terminal 130 are optional devices.

In the above application scenarios, the server 120 accesses scheduling policies in the following manner: obtaining frame data generated by the application program of the virtual environment during running; extracting target frame data corresponding to a target virtual object from the frame data; performing feature extraction on the target frame data to obtain a state feature of the target virtual object in a current state; and invoking a value network prediction model to process the state feature, to obtain expected returns of executing N scheduling policies by the target virtual object in the current state, N being a positive integer greater than or equal to 2. The target virtual object may be the first virtual object, or the second virtual object, or another virtual object controlled by another terminal.

A person skilled in the art may learn that there may be more or fewer terminals. For example, there may be only one terminal, or there may be dozens of or hundreds of or more terminals. The quantity and the device types of the terminals are not limited in the embodiments of this application.

Figure 2:
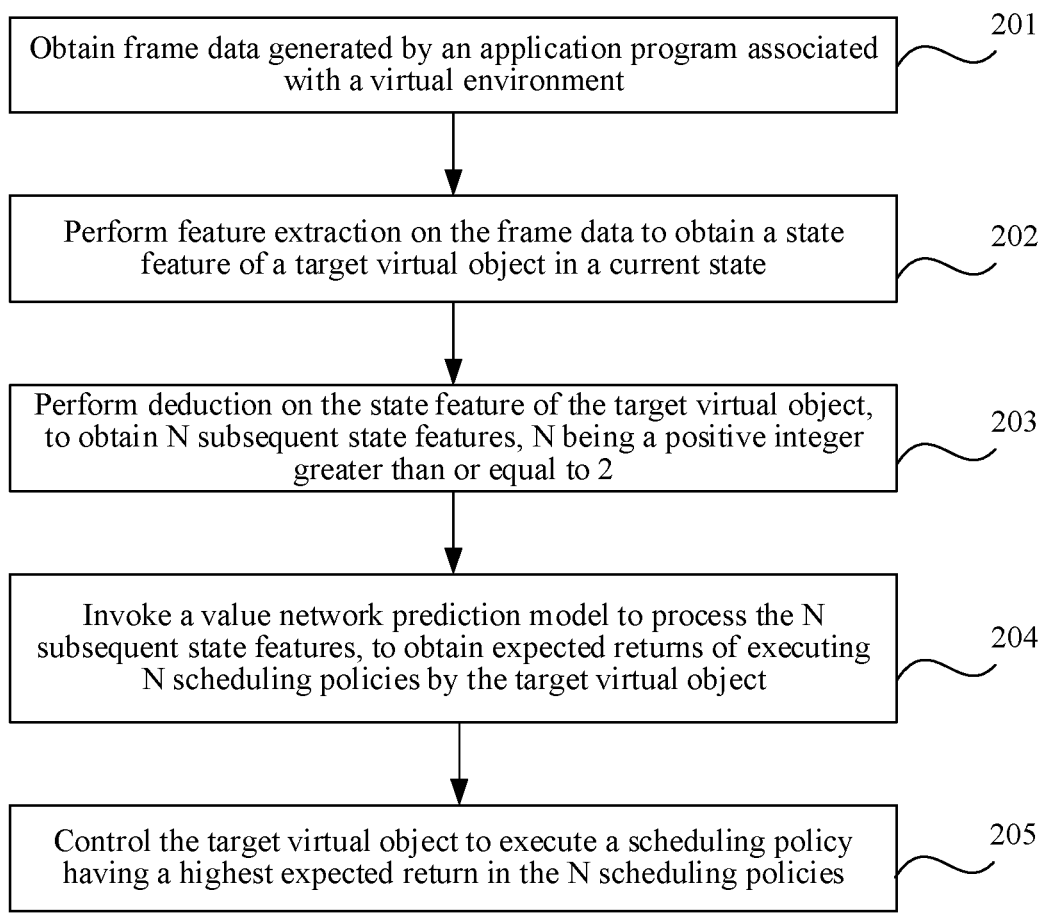
FIG. 2 is a flowchart of a method for scheduling virtual objects in a virtual environment according to some exemplary embodiments of this application.

FIG. 2 is a flowchart of a method for scheduling virtual objects in a virtual environment according to some exemplary embodiments of this application. The method is applicable to the computer system 100 shown in FIG. 1, and the method includes the following steps:

Step 201: Obtain frame data generated by an application program associated with the virtual environment.

The frame data is data generated by the application program of the virtual environment during running. The frame data includes data about each virtual object in the virtual environment and data about each virtual resource in the virtual environment. Because a user interface of the virtual environment is displayed by using a frame as a unit, the data generated by the application program during running is also in units of frames, and therefore is referred to as frame data. The server obtains frame data at intervals of a predetermined period, or each time new frame data is generated, the server obtains the newly generated frame data.

For example, the data about the virtual object includes at least one of a position (coordinates), attributes (an empirical value, an economic value, health points, a kill count, a death count, a resource value, an ability value, and the like) or a behavior (a moving-type behavior, a pick-up-type behavior, an attack-type behavior, or the like) of the virtual object; the virtual resource includes at least one of a building, a neutral creature, a troop, a means of transportation, a weapon, ammunition, and the like, and the data about the virtual resource includes at least one of a position (coordinates), attributes (an endurance value, health points, an ability value, attribution, and the like) or a behavior (a moving behavior, an attack behavior, or the like) of the virtual resource.

Step 202: Perform feature extraction on the frame data to obtain a state feature of a target virtual object in a current state.

The server performs feature extraction on the frame data to obtain the state feature of the target virtual object in the at least two virtual objects in the current state. The state feature includes states of associated virtual objects and states of the virtual resources.

The associated virtual objects are the target virtual object and a virtual object having a relationship with the target virtual object, for example, a virtual object belonging to the same camp as the target virtual object, and an enemy virtual object appearing in the field of view of the target virtual object or a virtual object belonging to the same camp as the target virtual object.

For example, the state feature of the target virtual object includes the states of the associated virtual objects and the states of the virtual resources. For example, a virtual object A, a virtual object B, and a virtual object C belong to a camp 1; a virtual object D, a virtual object E, and a virtual object F belong to a camp 2; and the virtual object A is a target virtual object controlled by the server. The virtual object D is in the field of view of the virtual object B. The virtual object E is in the field of view of the virtual object A, is in a fighting state with the virtual object A, and has a relationship with the virtual object A. The virtual object F is not in the fields of view of the virtual object A, the virtual object B, and virtual object C. Therefore, the associated virtual objects include the virtual object A, the virtual object B, the virtual object C, the virtual object D, and the virtual object E.

The server reads data of the associated virtual objects and data of the virtual resources in the frame data, and performs feature extraction, to obtain a state feature. For example, the state feature extracted by the server is S ($S_1^h, S_2^h, \ldots, S_{01}^t, S_{02}^t \ldots, S_{01}^m, S_{02}^m \ldots$). S represents the state feature of the target virtual object in the current state, $S^{*h}$ represents a state of a $*^{th}$ virtual object, $S^{*t}$ represents a state of a $*^{th}$ building, and $S^{*m}$ represents a state of a $*^{th}$ neutral creature.

Because the states of the associated virtual objects and the states of the virtual resources are sampled as the state feature, sampling on the current situation in the virtual environment is implemented. Because there are a limited quantity of associated virtual objects and virtual resources, the current situation in the virtual environment is discretized.

For example, the MOBA game includes two camps, each camp includes 5 virtual objects, and a map of the MOBA game includes 144 virtual resource positions that can be contended for, occupied or destroyed. Therefore, the extracted state feature includes states of 5 to 10 virtual objects and states of 144 virtual resources, thereby implementing sampling and discretization of the current situation in the virtual environment.

Step 203: Perform deduction on the state feature of the target virtual object, to obtain N subsequent state features, N being a positive integer greater than or equal to 2.

For example, deduction is performed on the state feature according to N scheduling policies, and each of the scheduling policies may be separately executed, to obtain a subsequent state feature corresponding to the each scheduling policy. The scheduling policies being moving to n accessible movement regions to perform m behaviors is used as an example. The target virtual object corresponds to m executable behaviors (including pickup-type behaviors and attack-type behaviors, where the pickup-type behavior includes at least one of picking up an item, equipping an item, destroying an item, modifying an item, and the like, and the attack-type behavior includes at least one of shooting, a physical attack, a spell attack, throwing ammunition, and the like) and n accessible movement regions. The m behaviors and the n accessible positions constitute N scheduling policies of the target virtual object, m and n being positive integers, m≥1, n≥2, m*n=N. The server calculates N subsequent state features transformed from the state feature in the current state caused by transformation of the current state to N subsequent situation states after the target virtual object executes the N scheduling policies. For example, in the current state feature, a state of a building 1 located in a movement region 1 is neutral, and an $i^{th}$ scheduling policy in the N scheduling policies of the target virtual object is moving to the movement region 1. After the target virtual object moves to the movement region 1, the state of building 1 in the movement region 1 is transformed from the neutral state to a controlled state.

Step 204: Invoke a value network prediction model to process the N subsequent state features, to obtain expected returns of executing the N scheduling policies by the target virtual object.

The expected return is used for representing a contribution from each of the scheduling policies to the winning condition of the battle in the virtual environment. The server inputs the N subsequent state features into the value network prediction model, to obtain the respective predicted returns corresponding to the scheduling policies. That is, the expected returns of executing the N scheduling policies by the target virtual object refer to the respective expected return corresponding to each of the N scheduling policies.

For example, the scheduling policies are moving to n movement regions. Regions to which the target virtual object can move are a movement region 1, a movement region 2, and a movement region 3. Through reading the state feature, it is learned that a state of the movement region 1 is a building in a neutral state, a state of the movement region 2 is that virtual objects in the same camp are battling with virtual objects in an enemy camp, and a state of the movement region 3 is a neutral creature in a neutral state. The value network prediction model predicts that an expected return of moving the target virtual object to the movement region 1 is 1; predicts that moving the target virtual object to the movement region 2 yields a beneficial effect on occupying the region, and an expected return is 3; and predicts that when being moved to the movement region 3, the target virtual object kills a neutral creature to obtain an empirical value, and an expected return is 2.

Step 205: Control the target virtual object to execute a scheduling policy having a highest expected return in the N scheduling policies.

The server obtains a scheduling policy corresponding to a highest expected return in the expected returns of the N scheduling policies as the target scheduling policy, and controls the target virtual object to execute the target scheduling policy. For example, as described in step 204, the server learns through calculation that the expected return of moving the target virtual object to the movement region 1 is 1, the expected return of moving the target virtual object to the movement region 2 is 3, and the expected return of moving the target virtual object to the movement region 3 is 2, then determines the scheduling policy having the highest expected return. That is, moving to the movement region 2 is the target scheduling policy, and the target virtual object is controlled to move to the movement region 2.

In some embodiments, the target scheduling policy may be selected from the N scheduling policies according to the expected returns of the scheduling policies, and the target virtual object is controlled to execute the target scheduling policy. For example, the foregoing scheduling policy having the highest expected return may be selected as the target scheduling policy, or the target scheduling policy may be selected in combination with another policy selection method. For example, the user may preset a priority of guaranteeing hit points of a hero. Therefore, a scheduling policy having an expected return higher than a preset ranking and a minimum hit point loss of the hero may be selected as the target scheduling policy.

Based on the above, in this embodiment of this application, the state feature in the current situation of the virtual environment is obtained. Because the states of the associated virtual objects and the states of the virtual resources are sampled as the state feature, sampling on the current situation in the virtual environment is implemented. Because there are a limited quantity of associated virtual objects and virtual resources, the current situation in the virtual environment is discretized. Therefore, the N subsequent state features can be obtained based on limited discretized state features in combination with the N scheduling policies, so as to process the N subsequent state features by invoking the value network prediction model, to obtain an expected return of executing each of the scheduling policies by the target virtual object. Alternatively, it may be unnecessary to perform deduction on the state feature of the current state to the last state feature meeting a winning or losing condition, thereby simplifying deduction steps, implementing deduction on situation states of the virtual environment, and further improving the accuracy of AI in controlling a virtual object to execute a scheduling policy.

In addition, in this embodiment of this application, the scheduling policy executed by the virtual object is obtained by performing deduction based on the state feature of the current situation and the N scheduling policies to obtain the N subsequent state features, and processing the N state features by using a value network model. Therefore, it is independent of logic of the application program of the virtual environment, thereby improving adaptability of AI in controlling scheduling of a virtual object.

Before invoking the value network prediction model to process the state feature, the server needs to train the value network prediction model. Training data of the value network prediction model is based on historical data of running the application program of the virtual environment by the user. A training process of the value network prediction model is described in the following embodiment.

Figure 3:
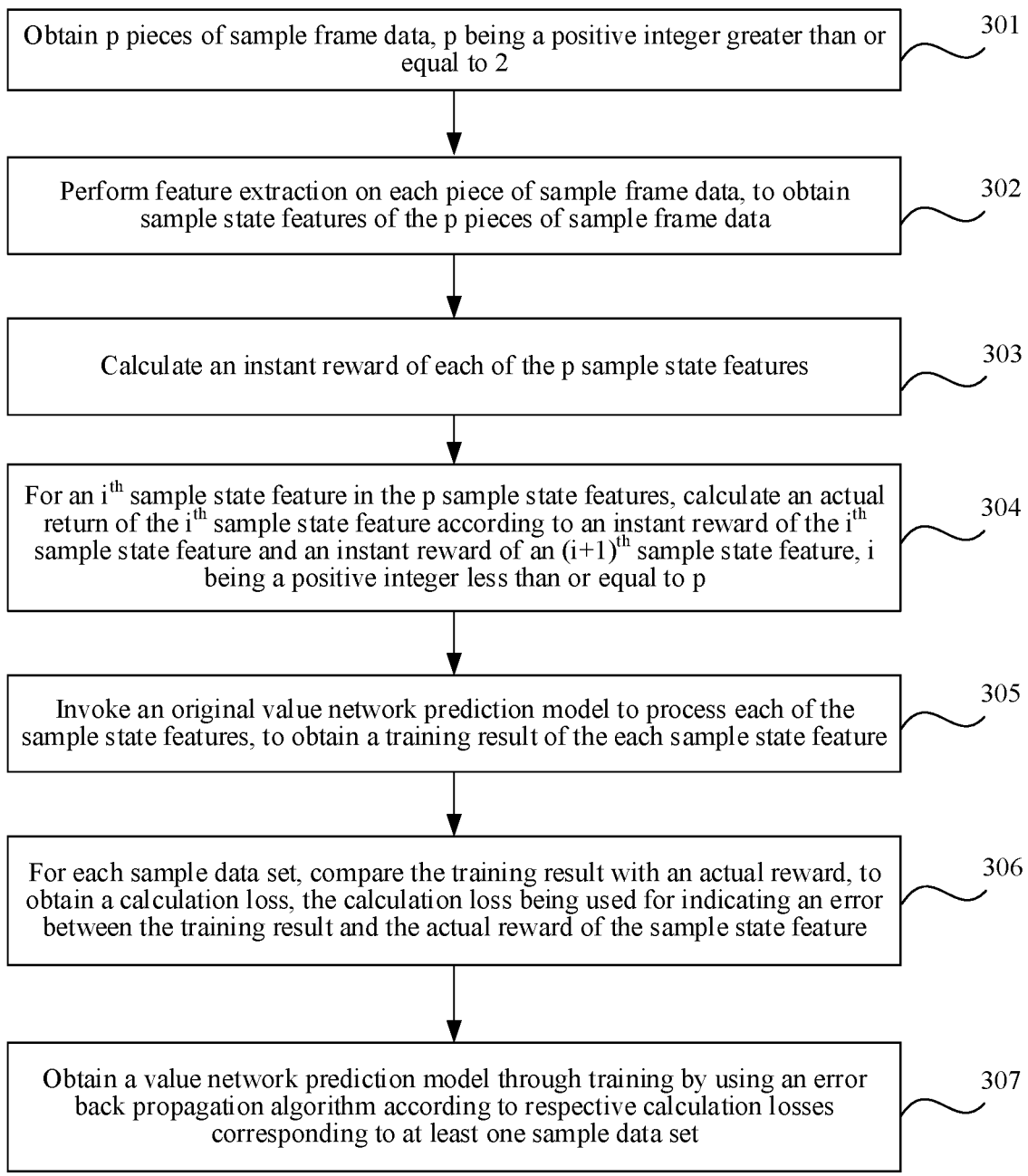
FIG. 3 is a flowchart of a method for training a value network prediction model according to some exemplary embodiments of this application.

FIG. 3 is a flowchart of a method for training a value network prediction model according to some exemplary embodiments of this application. The method is applicable to the computer system 100 shown in FIG. 1. The method may be a method performed before step 202 in the embodiment in FIG. 2. The method includes the following steps:

Step 301: Obtain p pieces of sample frame data, p being a positive integer greater than or equal to 2;

Optionally, the method for obtaining the p pieces of sample frame data by the server includes, but is not limited to the following steps:

Step 301*a*: Obtain l pieces of historical frame data, l being a positive integer greater than or equal to p.

The server obtains historical frame data generated by the application program of the virtual environment during running, to obtain l pieces of historical target frame data.

For example, running one round of the MOBA game that meets the winning condition generates historical frame data of about 20,000 frames. The server obtains, by using a frame as a unit, historical frame data generated by running at least one round of the MOBA game, so as to obtain the historical frame data.

Step 301*b*: Extract l pieces of historical frame data according to a preset time step, to obtain q pieces of candidate frame data, q being a positive integer, $p \leq q \leq l$.

The server performs extraction on m pieces of historical frame data by using a preset time step as a unit, to obtain q pieces of candidate frame data. For example, a time interval between the historical frame data is 0.05 seconds, and the server performs extraction on the historical frame data by using a preset time step 1 second as a unit, to obtain the candidate frame data, thereby reducing an amount of frame data to be processed by 95%.

Step 301*c*: Read the q pieces of candidate frame data, and determine candidate frame data, which includes an attack behavior, in the q pieces of candidate frame data as sample frame data, to obtain the p pieces of sample frame data, where $n \leq q$.

The server reads the candidate frame data, and determines candidate frame data, which includes an attack behavior, in the candidate frame data as the sample frame data, so as to obtain the p pieces of sample frame data.

Step 302: Perform feature extraction on each piece of sample frame data, to obtain sample state features of the p pieces of sample frame data.

The server performs feature extraction on the sample frame data, to obtain a state feature of the p pieces of sample frame data. The state feature includes states of associated virtual objects and states of virtual resources.

Optionally, the virtual resource includes at least one of a building, a neutral creature, a troop, a means of transportation, a weapon, or ammunition; the states of the associated virtual objects include at least one of positions, health points, attack power values, defense power values, empirical values, kill counts, death counts, or economic values of the associated virtual objects; and the states of the virtual resources include at least one of positions, health points, attack power values, defense power values, endurance values, or occupation states of the virtual resources.

The occupation state of the virtual resource includes a neutral state, a controlled state, an occupied state, or a contested state.

The neutral state is used for representing that the virtual resource does not belong to any camp. For example, occupation states of a neutral creature and a neutral building are neutral states, and virtual objects in any camp may attack the neutral creature, causing the neutral creature to be in a controlled state.

The controlled state is used for representing that there is at least one virtual objects belonging to the same camp within the movement region in which the virtual resource is located. For example, if a neutral building 1 is located in a movement region 1, and there is a virtual object A belonging to a camp 1 in the movement region 1, the occupation state of the neutral building 1 is a state of being controlled by the camp 1.

The occupied state is used for representing that the virtual resource belongs to any camp. For example, if a defensive tower 1 is a building belonging to a camp 1, other camps cannot control the defensive tower 1, and virtual objects in other camps can only bypass the defensive tower 1 or destroy it during moving.

The contested state is used for representing that there are at least two virtual objects belonging to different camps within the movement region in which the virtual resource is located. For example, if there are virtual objects respectively belonging to a camp 1 and a camp 2 in a movement region in which a neutral creature or a neutral building is located, the occupation state of the neutral creature or neutral building is a contested state.

Figure 4:
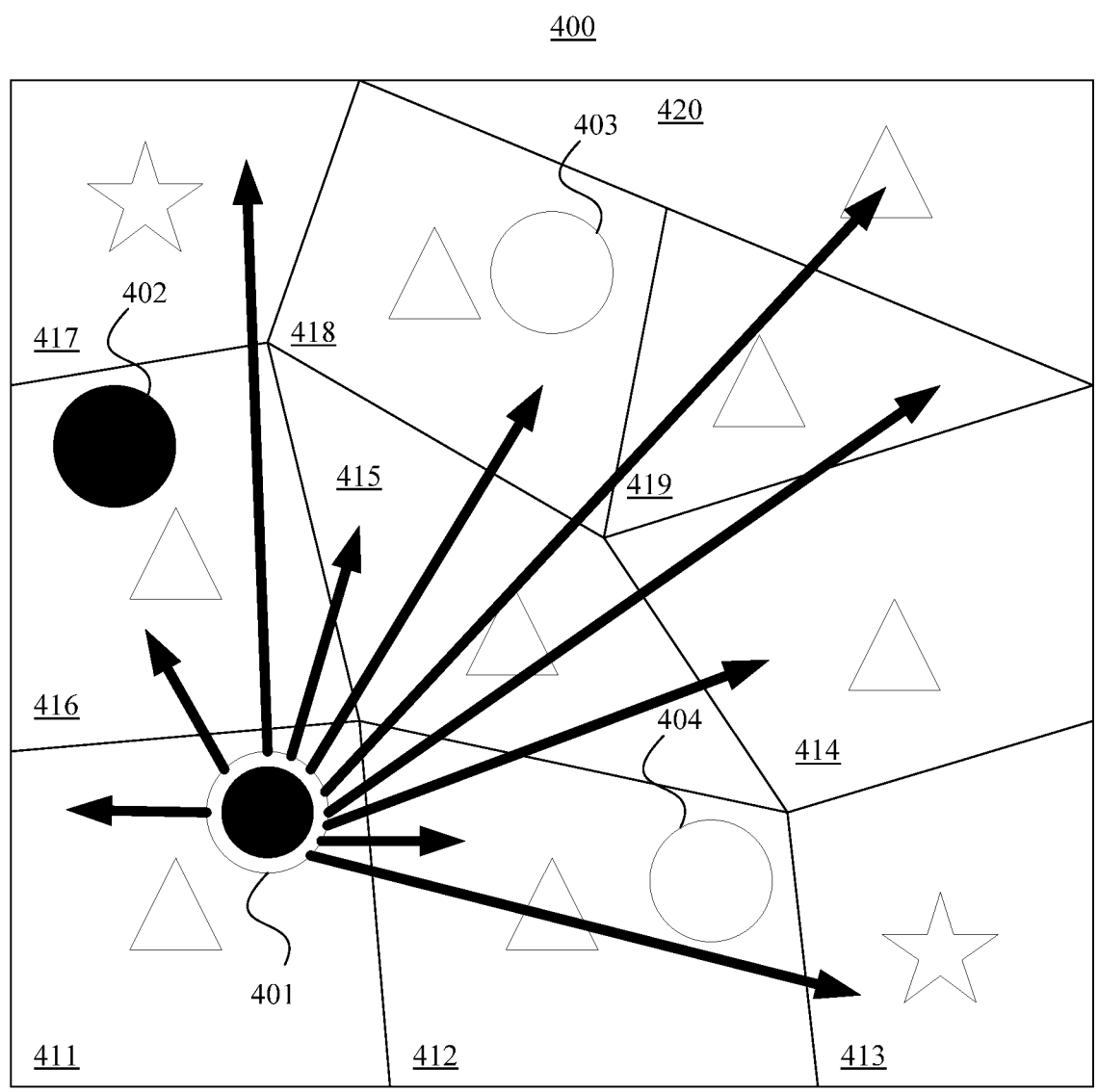
FIG. 4 is a schematic diagram of a map of a virtual environment according to some exemplary embodiments of this application.

In this embodiment of this application, a map of the virtual environment is divided into n movement regions based on positions of the virtual resources, n being a positive integer greater than or equal to 2. For example, as shown in FIG. 4, a map 400 of a virtual environment is divided into 10 movement regions 411 to 420 based on positions of the virtual resources (in FIG. 4, triangles are identifiers of virtual buildings, and pentagrams are identifiers of neutral creatures). The map 400 shows a target virtual object 401, a virtual object 402 belonging to the same camp as the target virtual object 401, a virtual object 404 in the field of view of the target virtual object 401 and belonging to a hostile camp, and a virtual object 403 in field of view of the virtual object 402 and belonging to a hostile camp. As shown by arrows in FIG. 4, movement regions accessible to the target virtual object are 10 movement regions (including a movement region 411 in which the target virtual object is located).

Step 303: Calculate an instant reward of each of the p sample state features.

For example, the server reads a behavior and a state of a virtual object in the sample state feature, and calculates a change of the state caused by executing the behavior by the virtual object, so as to calculate a contribution to the winning condition based on the change of the state, to obtain the instant reward. For example, an empirical value of the virtual object in a sample state feature 1 is 2, and the behavior of the virtual object is attacking a neutral creature. After killing the neutral creature, the virtual object can obtain an empirical value of 3. That is, an empirical value obtained after the virtual object kills the neutral creature is 5. The server calculates a contribution from an increase in the empirical value of the virtual object from 2 to 5 to the winning condition, to obtain an instant reward of the sample state feature 1.

Step 304: For an $i^{th}$ sample state feature in the p sample state features, calculate an actual return of the $i^{th}$ sample state feature according to an instant reward of the $i^{th}$ sample state feature and an instant reward of an $(i+1)^{th}$ sample state feature, i being a positive integer less than or equal to p.

An actual return of each state feature is an accumulation result. For example, an $x^{th}$ sample state feature to a $y^{th}$ sample state feature in the p sample state features are the initial state feature to the last state feature in the same round of battle. The $i^{th}$ sample state feature is any sample state feature from the $x^{th}$ sample state feature to the $y^{th}$ sample state feature. An actual return of the $i^{th}$ sample state feature is an accumulation value from an instant reward of the $(i+1)^{th}$ sample state feature to an instant reward of the $y^{th}$ sample state feature.

For example, the actual return of the $i^{th}$ sample state feature may be calculated by using the following formula:

$$G_i = R_{i+1} + \lambda R_{i+2} + \lambda^2 R_{i+3} + \ldots = \sum_{k=0}^{\infty} \lambda^k R_{i+k+1}$$

where $G_i$ represents the actual return of the $i^{th}$ sample state feature, $R*$ represents an instant reward of a $*^{th}$ sample state feature, $\lambda*^{-i-1}$ represents an impact factor of the instant reward of the $*^{th}$ sample state feature on the $i^{th}$ sample state feature, and a longer time from the $*^{th}$ sample state feature to the $i^{th}$ sample state feature indicates a smaller impact factor.

The actual return of the $i^{th}$ sample state feature after execution of a scheduling policy θ may be calculated by using the following formula:

$$V_\theta(s) = E[G_i \mid S_i = s] =$$
$$E[R_{i+1} + \lambda R_{i+2} + \lambda^2 R_{i+3} + \ldots \mid S_i = s] = E[R_{i+1} + \lambda v(S_{i+1}) \mid S_i = s]$$

where $V_\theta(s)$ represents an actual return of the sample state feature S after execution of the scheduling policy θ, E[s] represents an expected return under the state feature s, and v represents a parameter obtained through iterative calculation.

The server may repeatedly perform steps 301 to 304, and continuously obtain sample frame data by using a round as a unit, so as to extract a plurality of sample data sets of sample state feature-reward (instant reward and actual return).

Step 305: Invoke an original value network prediction model to process each of the sample state features, to obtain a training result of the each sample state feature.

The server inputs the each sample state feature into the original value network prediction model, to obtain a training result of the each sample state feature. The original value network prediction model is an untrained machine learning model, and the training result of the each sample state feature is an expected return, predicted by the original value network model, of executing each scheduling policy under the sample state feature.

Step 306: For each of the sample data sets, compare the training result with an actual reward, to obtain a calculation loss, the calculation loss being used for indicating an error between the training result and the actual reward of the sample state feature.

For example, taking a sample state feature $S_1$ as an example, an actual return of executing a scheduling policy $\theta_1$ is 2, an actual return of executing a scheduling policy $\theta_2$ is −1, and an actual return of executing a scheduling policy $\theta_3$ is 3; a training result of the sample state feature $S_1$ is as follows: an expected return of executing the scheduling policy $\theta_1$ is 1.5, an expected return of executing the scheduling policy $\theta_2$ is −1, and an expected return of executing the scheduling policy $\theta_3$ is 2. In this case, a calculation loss is (0.5, 0, 1).

Step 307: Obtain the value network prediction model through training by using an error back propagation algorithm according to respective calculation loss corresponding to at least one sample data set.

The server obtains the value network prediction model through training by using the error back propagation algorithm according to the respective calculation loss corresponding to the at least one sample data set. The value network prediction model is used for predicting, according to the state feature, an expected return of executing each scheduling policy under the state feature.

Based on the above, in this embodiment of this application, the state feature of the sample frame data is extracted by reading data in the sample frame data, where the state feature includes the states of the associated virtual objects and the states of the virtual resources. Because it is unnecessary for the server to use all parameters in the virtual environment as the state feature to represent a state of the sample frame data, determining of the state feature is simplified, thereby reducing a calculation amount of the server, and improving a processing speed of the server.

Optionally, in this embodiment of this application, candidate frame data is extracted from the historical frame data according to a preset time step, and frame data, which includes an attack behavior, in the candidate frame data is determined as the sample frame data. Because it is unnecessary to process all the historical target frame data, processing efficiency of the server is improved.

Optionally, in this embodiment of this application, an instant reward of each frame of sample frame data is calculated; an actual return of the current sample frame data is calculated according to the instant reward of the current sample frame data and an instant reward of a next frame of sample frame data. Because it is unnecessary to accumulatively calculate impact from each frame of sample frame data after the current sample frame data on the actual return, the calculation amount of the server is reduced, thereby improving the processing speed of the server.

Figure 5:
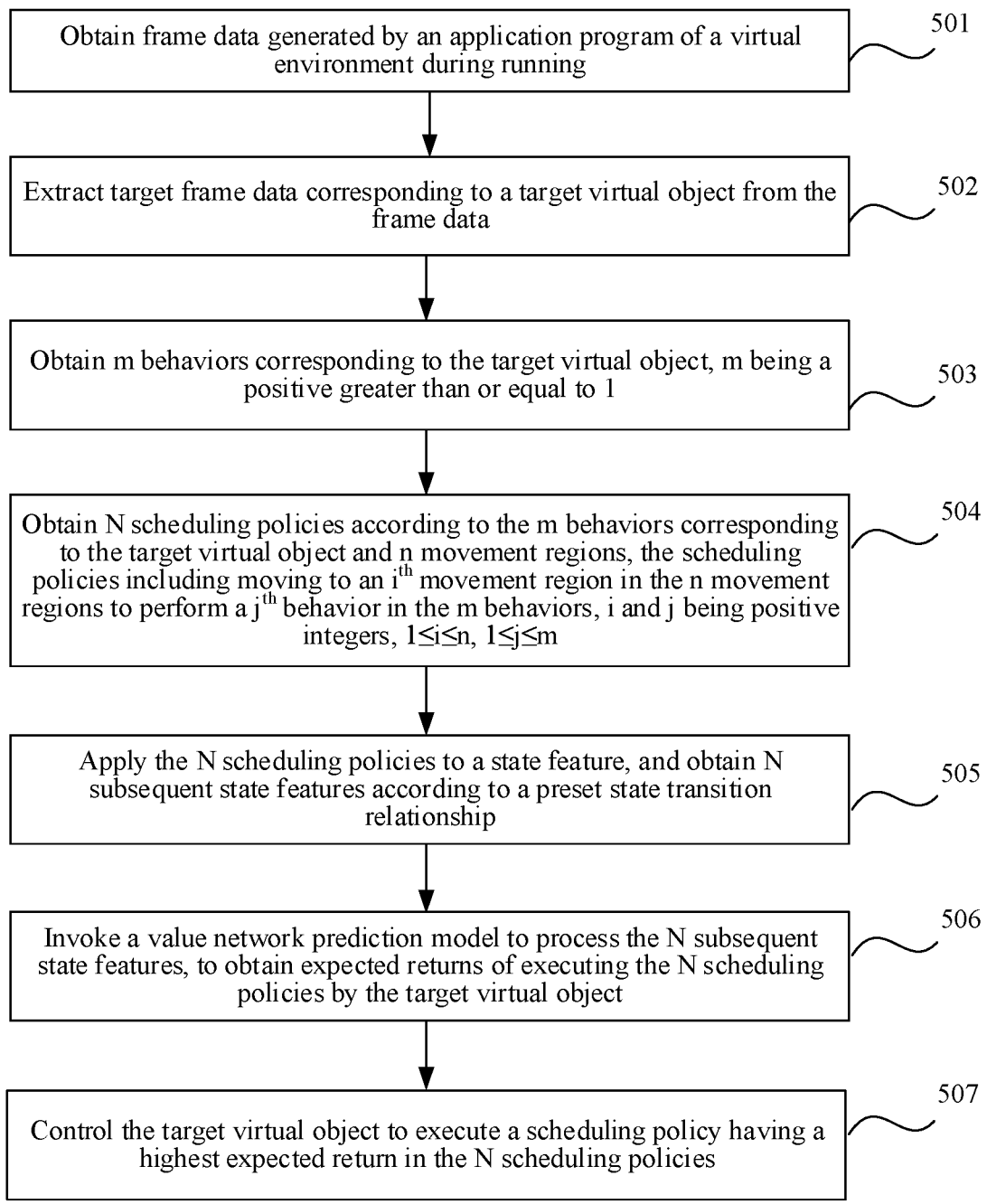
FIG. 5 is a flowchart of a method for scheduling virtual objects in a virtual environment according to some exemplary embodiments of this application.

FIG. 5 is a flowchart of a method for scheduling virtual objects in a virtual environment according to some exemplary embodiments of this application. The method is applicable to the computer system 100 shown in FIG. 1, and the method includes the following steps:

Step 501: Obtain frame data generated by an application program of the virtual environment during running.

For the method for obtaining the frame data by the server, reference may be made to step 201 in the embodiment in FIG. 2, and details are not described herein.

Step 502: Perform feature extraction on the frame data to obtain a state feature of a target virtual object in a current state.

The server performs feature extraction on the frame data to obtain the state feature of the target virtual object in the current state. The state feature includes states of associated virtual objects and states of virtual resources.

Optionally, the virtual resource includes at least one of a building, a neutral creature, a troop, a means of transportation, a weapon, or ammunition; the states of the associated virtual objects include at least one of positions, health points, attack power values, defense power values, empirical values, kill counts, death counts, or economic values of the associated virtual objects; the states of the virtual resources include at least one of positions, health points, attack power values, defense power values, endurance values, or occupation states of the virtual resources; and the occupation state of the virtual resource includes a neutral state, a controlled state, an occupied state, or a contested state.

For the method for performing feature extraction on the frame data to obtain the state feature of the target virtual object in the current state by the server, reference may be made to step 201 in the embodiment in FIG. 2 and steps in the embodiment in FIG. 3.

Step 503: Obtain m behaviors corresponding to the target virtual object, m being a positive greater than or equal to 1.

The server reads data of the target virtual object in the frame data, to obtain m behaviors executable by the target virtual object. The behaviors include pickup-type behaviors and attack-type behaviors. Optionally, the pickup-type behavior includes at least one of picking up an item, equipping an item, destroying an item, modifying an item, and the like; and the attack-type behavior includes at least one of shooting, a physical attack, a spell attack, throwing ammunition, and the like.

Step 504: Obtain the N scheduling policies according to the m behaviors corresponding to the target virtual object and the n movement regions, the scheduling policies including moving to an $i^{th}$ movement region in the n movement regions to perform a $j^{th}$ behavior in the m behaviors, i and j being positive integers, 1≤i≤n, 1≤j≤m.

For example, the server forms a scheduling policy space according to the m behaviors and the n movement regions. The space is a matrix of m rows and n columns, or the space is a matrix of n rows and m columns. The scheduling policy space includes N scheduling policies.

Step 505: Apply the N scheduling policies to the state feature, and obtain N subsequent state features according to a preset state transition relationship.

The state transition relationship is used for representing state changes of the state feature after the application of the scheduling policies.

For example, an expression form of the state transition relationship is a state transition matrix. The state transition matrix includes mapping relationships between states and behaviors of the virtual objects and the virtual resources. The server obtains the N subsequent state features by multiplying the scheduling policy space by the state transition matrix.

For example, a behavior of a virtual object in a scheduling policy is a physical attack, an attack power of the physical attack is 5, and an endurance value of an attacked building 1 in the state feature S is 6; in this case, an endurance value of the building 1 in the subsequent state feature S' is 1.

Step 506: Invoke a value network prediction model to process the N subsequent state features, to obtain expected returns of executing the N scheduling policies by the target virtual object.

Figure 6:
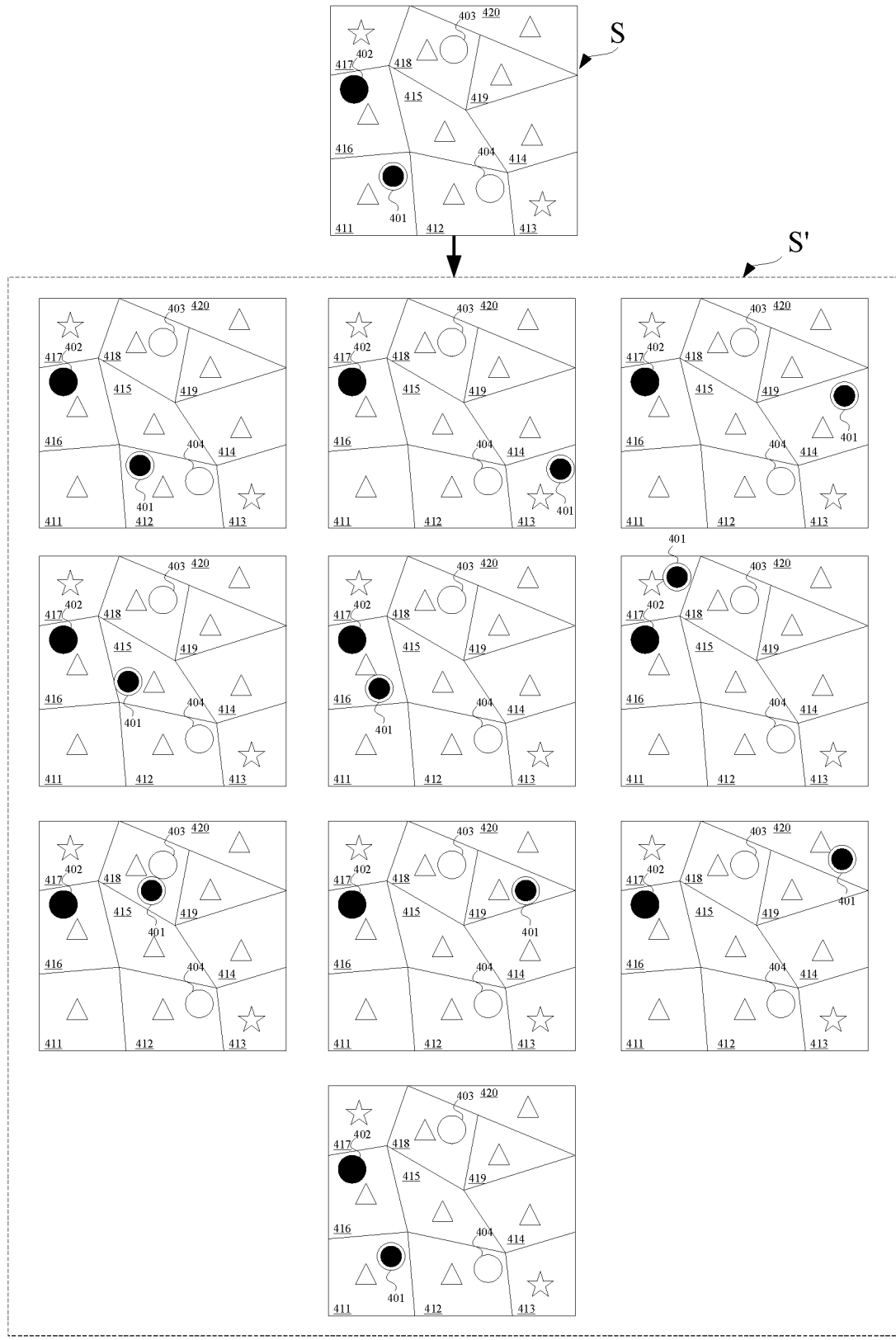
FIG. 6 is an effect diagram of state feature deduction according to some exemplary embodiments of this application.

For example, as shown in FIG. 6, in the state feature S, a target virtual object 401 is located in a movement region 411, and the target virtual object 401 executes N scheduling policies to cause the state feature to be transformed into the subsequent state feature S'. In a state feature space of the subsequent state feature S', the target virtual object 401 may be located in the movement regions 411 to 420 to perform a plurality of executable actions. The server invokes a value network prediction model to process the subsequent state feature S', to obtain an expected return of each subspace in the subsequent state feature S'.

Step 507: Control the target virtual object to execute a scheduling policy having a highest expected return in the N scheduling policies.

The server obtains a scheduling policy having a highest expected return in the expected returns of in the N scheduling policies as the target scheduling policy, and sends a control instruction to a terminal. The control instruction is used for instructing the terminal to control the target virtual object to execute the target scheduling policy.

Based on the above, in this embodiment of this application, the state feature in the current state is extracted. Because the state feature merely includes the states of the associated virtual objects and the states of the virtual resources, discretization and sampling processing on the current situation in the virtual environment is implemented. Therefore, the N subsequent state features of the state feature in the current situation can be obtained based on the state feature of the current state in combination with the N scheduling policies. Further, the N subsequent state features are processed by invoking the value network prediction model, to obtain an expected return of executing each of the scheduling policies by the target virtual object. It is unnecessary to perform deduction on the state feature of the current state to a last state feature meeting a winning or losing condition, thereby simplifying deduction steps, implementing deduction on situation states of the virtual environment, and further improving the accuracy of AI in controlling a virtual object to execute a scheduling policy.

The steps of the embodiments of this application are not necessarily performed according to a sequence indicated by step numbers. Unless otherwise clearly specified in this specification, the steps are performed without any strict sequence limit, and may be performed in other orders. Moreover, at least some of the steps in the embodiments may include a plurality of sub-steps or a plurality of stages. The sub-steps or stages are not necessarily performed at the same time point but may be performed at different time points. The sub-steps or stages are not necessarily performed sequentially, but may be performed in turn or alternately with other steps or at least some sub-steps or stages of other steps.

In an embodiment, a server is further provided. The server includes an apparatus for scheduling virtual objects in a virtual environment. The apparatus for scheduling virtual objects in a virtual environment includes modules, and each module may be entirely or partially implemented by using software, hardware, or a combination thereof.

Figure 7:
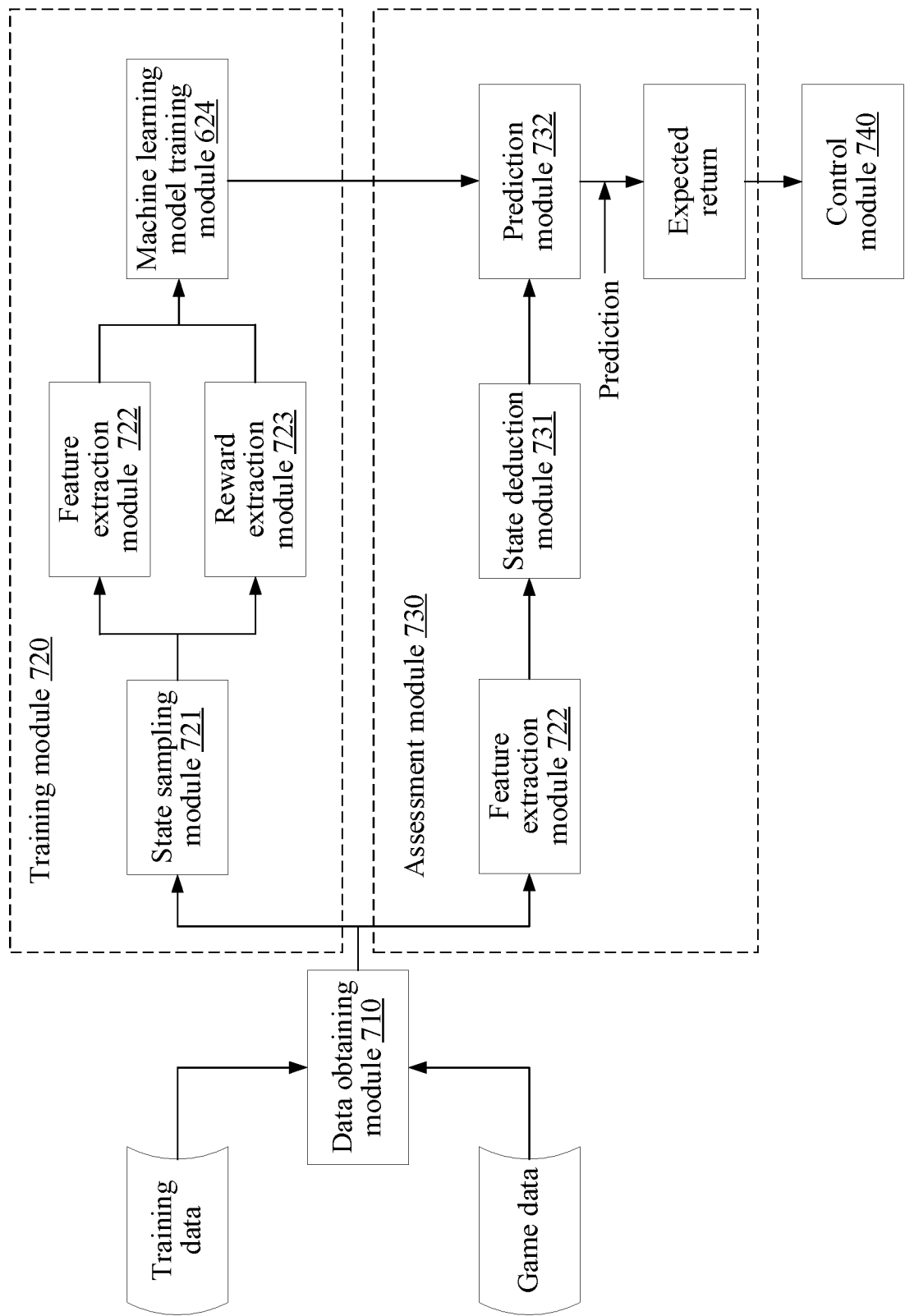
FIG. 7 is an overall architectural diagram of a virtual apparatus according to some exemplary embodiments of this application.

In an exemplary embodiment, as shown in FIG. 7, a server in this embodiment of this application includes a data obtaining module 710, a training module 720, a value assessment module 730, and a control module 740. The value network training module 720 includes a state sampling module 721, a feature extraction module 722, a reward extraction module 723, and a machine learning training module 724. The value assessment module 730 includes a feature extraction module 722, a state deduction module 731, and a prediction module 732. Each module is described as follows:

1. Training Module:

State sampling module 721: Generally, one round of a MOBA game lasts longer than tens of minutes, and frame data converted into the game is more than tens of thousands of frames. However, in an actual game process, the macro situation changes relatively slowly, and situation states of frame data are highly correlated. Because an attack behavior of a virtual object is the main factor in a change of the situation state, in the state sampling module 721, historical frame data of the MOBA game is sampled by using the attack behavior of the virtual object as the core, supplemented by a preset time step, to obtain sample data, thereby obtaining sample data based on the attack behavior. In this way, frame data of which the situation states are less correlated is retained while the sample data is reduced.

Figure 8:
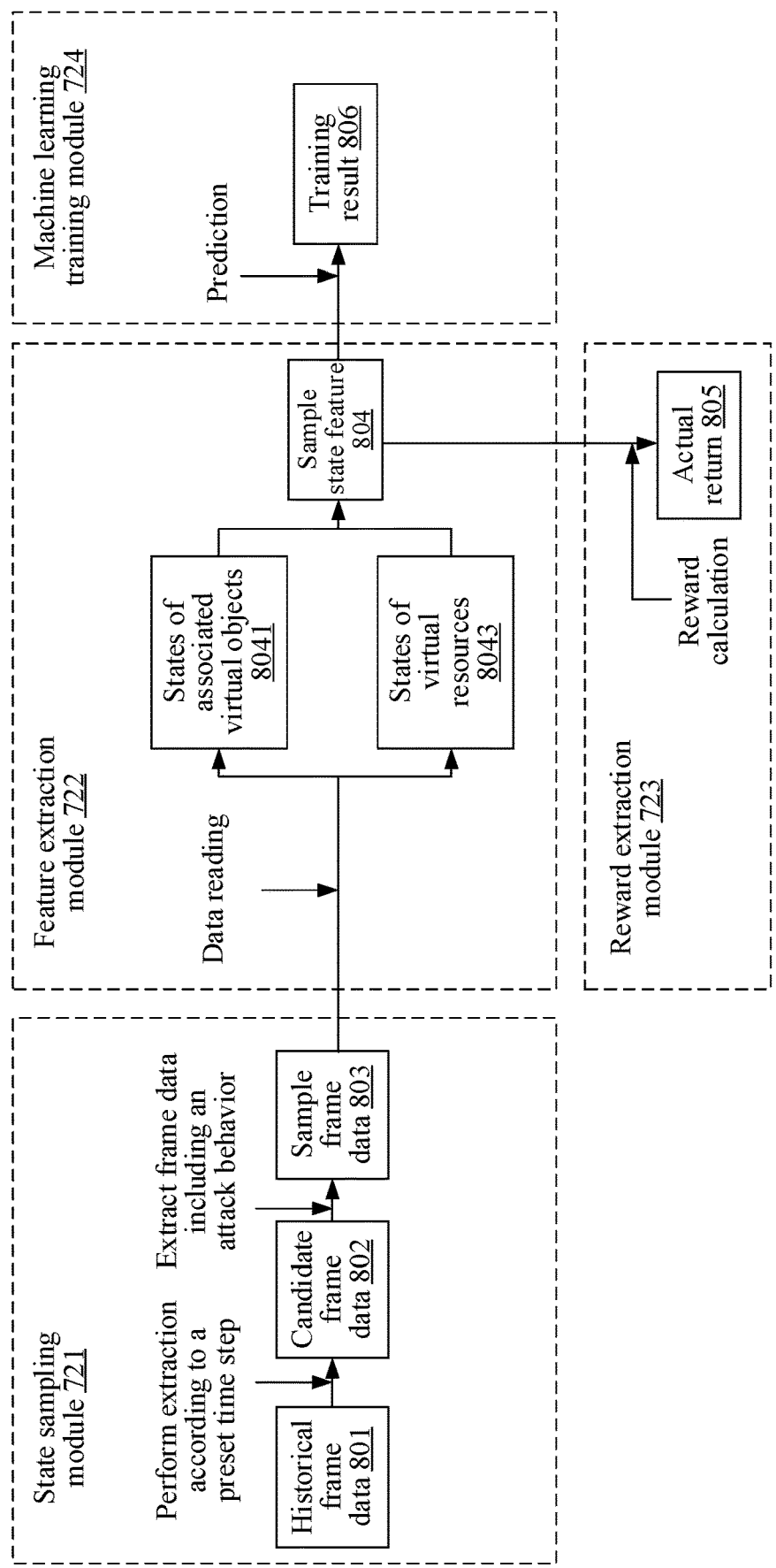
FIG. 8 is a working flowchart of a training module according to some exemplary embodiments of this application.

As shown in FIG. 8, the data obtaining module 710 obtains historical frame data 801 generated in one round of the MOBA game, and sends the historical frame data 801 to the state sampling module 721; the state sampling module 721 performs extraction on the historical target frame data 801 at a preset time step to obtain candidate frame data 802, and reads frame data including an attack behavior in the candidate frame data 802, to obtain sample frame data 803.

The feature extraction module 722 extracts states 8041 of associated virtual objects and states 8042 of virtual resources in the sample frame data 803 to obtain a sample state feature 804.

Reward extraction module 723: an expected return predicted by a value network model represents a return that is obtained when a particular scheduling policy is executed in a situation state at a particular time point t, that is, the accumulation of instant rewards at all subsequent time points. In practice, unless one round of game is over, a return of each situation state cannot be calculated by explicitly obtaining all instant rewards. Therefore, the Bellman equation can be introduced, so that calculation of a return in the current state is merely related to a return in a next situation state and an instant reward in the current state. Reference factors for the instant reward include, but are not limited to, an empirical value of the virtual object, an economic value, physical strength (health points) of the virtual object, a kill count, a death count, and an endurance value of a building. In this embodiment of this application, as shown in FIG. 7, the reward extraction module 723 calculates an instant reward of each sample state feature 804, and calculates, according to an instant reward of each of a plurality of sample state features 804 and an instant reward of a next frame sample state feature, an actual return 805 of the each sample state feature.

The machine learning training module 724 performs a large amount of iterative training through a machine learning model, such as a multi-layer convolutional neural network, by using sample data sets including situation state features obtained from historical battle frame data of a user in a MOBA game and actual returns, to obtain a value network prediction model through the training. In this embodiment of this application, the server inputs each sample state feature 804 into an original value network prediction model to obtain a training result 806, and obtains a calculation loss according to a difference between the training result 806 and the actual return 805, to train the original value network prediction model, to obtain the value network prediction model.

2. Value Assessment Modules:

The feature extraction module 722 performs state extraction on frame data generated in the MOBA game, to obtain a state feature of each piece of frame data.

Figure 9:
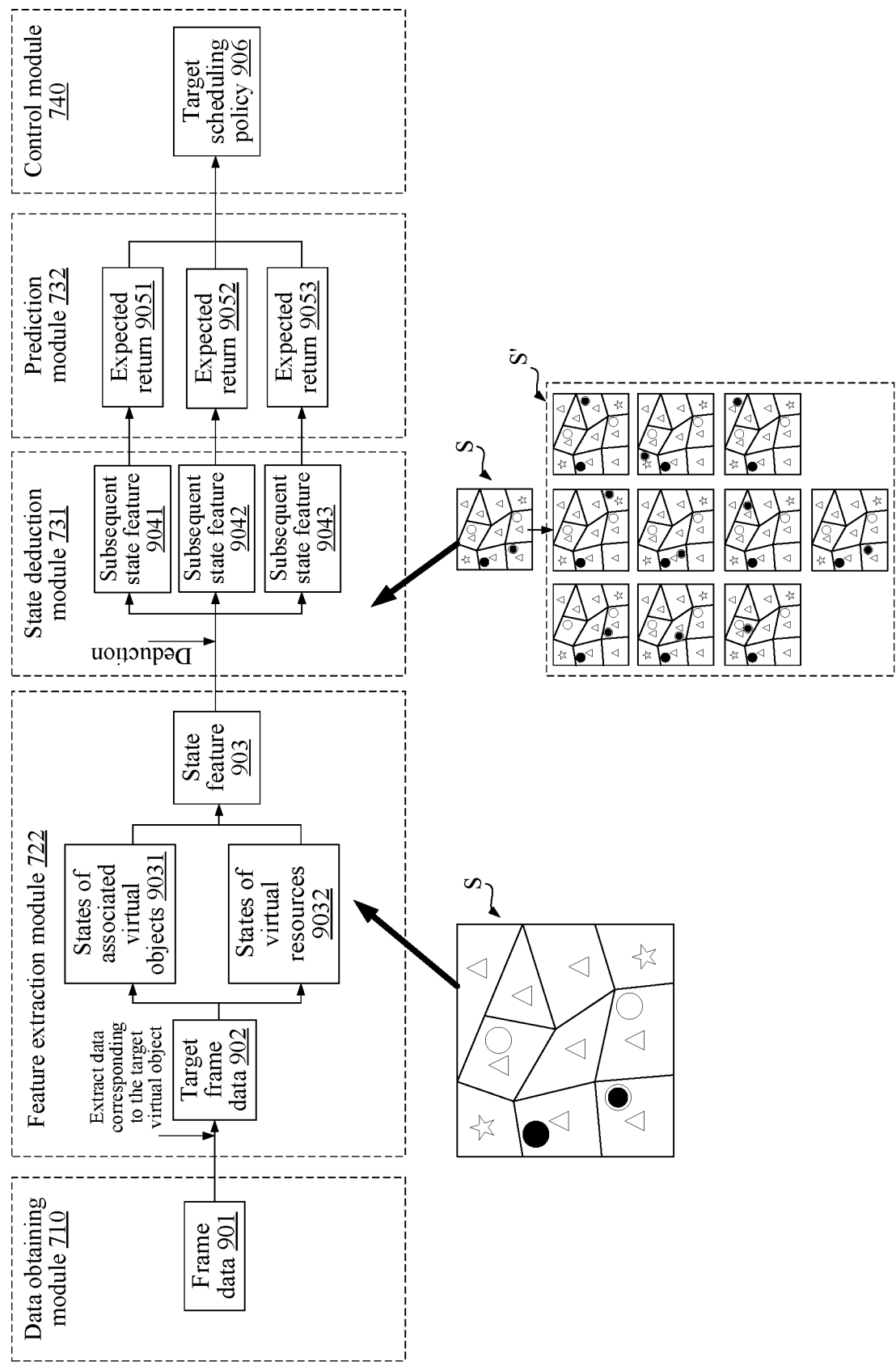
FIG. 9 is a working flowchart of a prediction module according to some exemplary embodiments of this application.

For example, as shown in FIG. 9, the data obtaining module 710 obtains frame data 901 in the current state, and sends the frame data 901 to the feature extraction module 722; the feature extraction module 722 reads states 9031 of associated virtual objects and states 9032 of virtual resources in the frame data 901, to obtain a state feature 903, and sends the state feature 903 to the state deduction module 731.

The state deduction module 731 performs deduction on the state feature 903 according to N scheduling policies, to obtain subsequent state features 9041, 9042 and 9043 transformed from the state feature 903 after the target virtual object executes the N scheduling policies, and sends the subsequent state features to the prediction module 732.

The prediction module 732 performs prediction on the state features 9041, 9042 and 9043 by using the trained value network model, and outputs expected returns 9051, 9052, and 9053 corresponding to the state features 9041, 9042, and 9043 respectively.

3. Control Module

The control module 740 uses, according to the expected returns 9051, 9052, and 9053 outputted by the prediction module 732, a scheduling policy having a highest expected return as the target scheduling policy, and controls the target virtual object to execute the target scheduling policy.

Figure 10:
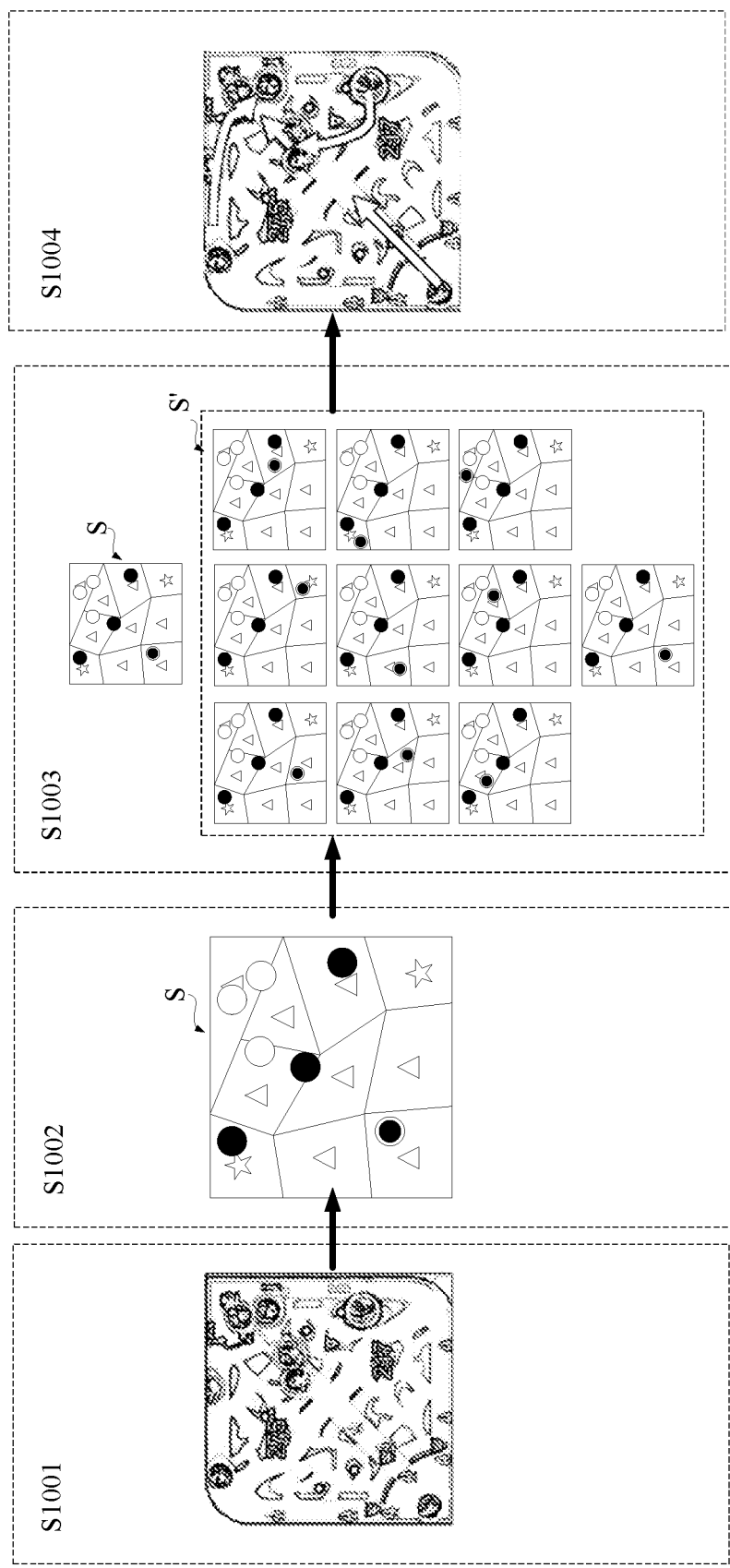
FIG. 10 is a schematic working diagram of a prediction module according to some exemplary embodiments of this application.

In an exemplary embodiment, as shown in FIG. 10, which is an exemplary scheduling flowchart of this application, the process includes the following steps:

In step S1001, a data obtaining module obtains frame data, where the frame data may be data corresponding to a global map in step S1001; in step S1002, a feature extraction module reads states of associated virtual objects (that is, a state of a hero of a home camp and a state of a hero of an enemy camp within the field of view of the hero of the home camp) and states of virtual resources (including states of strongholds of both sides and states of neutral creatures) in the frame data, and extracts a state feature S of a current state; in step S1003, a state deduction module performs deduction on the state feature S to obtain a state feature space S' formed by a plurality of subsequent state features; and in step S1004, after a prediction module determines a scheduling policy having a highest expected return, a control module controls a target virtual object to execute the scheduling policy having the highest return (the target virtual object may be any hero in the home camp, and the arrow direction in step S1004 in FIG. 10 is the determined scheduling policy).

Figure 11:
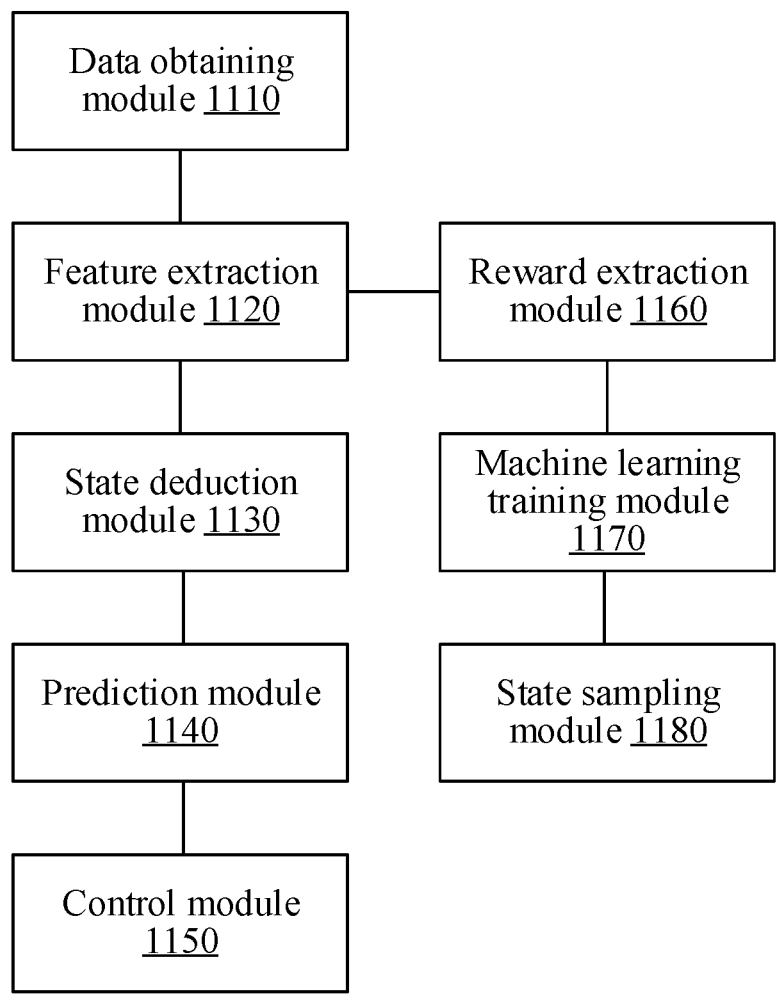
FIG. 11 is a block diagram of an apparatus for scheduling virtual objects in a virtual environment according to some exemplary embodiments of this application.

FIG. 11 is a structural block diagram of an apparatus for scheduling virtual objects in a virtual environment according to some exemplary embodiments of this application. The apparatus may be implemented as the server 120 in the embodiment in FIG. 1 by using software, hardware, or a combination thereof. The apparatus includes a data obtaining module 1110, a feature extraction module 1120, a state deduction module 1130, a prediction module 1140, a control module 1150, a reward extraction module 1160, a machine learning training module 1170, and a state sampling module 1180. The reward extraction module 1160, the machine learning training module 1170, and the state sampling module 1180 are optional modules.

The data obtaining module 1110 is configured to obtain frame data generated by an application program of the virtual environment during running.

The feature extraction module 1120 is configured to perform feature extraction on the frame data to obtain a state feature of a target virtual object in at least two virtual objects in the current state, the state feature including states of associated virtual objects and states of the virtual resources.

The state deduction module 1130 is configured to perform deduction on the state feature according to N scheduling policies, to obtain N subsequent state features, N being a positive integer greater than or equal to 2.

The prediction module 1140 is configured to invoke a value network prediction model to process the N subsequent state features, to obtain expected returns of executing the N scheduling policies by the target virtual object.

The control module 1150 is configured to control the target virtual object to execute a scheduling policy having a highest expected return in the N scheduling policies.

In an optional embodiment, a map of the virtual environment is divided into n movement regions, n being less than a number of pixels of the map, n being a positive integer greater than or equal to 2.

The state deduction module 1130 is further configured to: obtain m behaviors corresponding to the target virtual object, m being a positive greater than or equal to 1; obtain the N scheduling policies according to the m behaviors corresponding to the target virtual object and n movement regions, the scheduling policies including moving to an $i^{th}$ movement region in the n movement regions to perform a $j^{th}$ behavior in the m behaviors, i and j being positive integers, $1 \leq i \leq n$, $1 \leq j \leq m$; and apply the N scheduling policies to the state feature, to obtain the N subsequent state features according to a preset state transition relationship.

In an optional embodiment, the map of the virtual environment is evenly divided into an array of n movement regions; alternatively, the map is divided into the n movement regions according to positions of the virtual resources.

In an optional embodiment, the feature extraction module 1120 is further configured to read the states of the associated virtual objects and the states of the virtual resources in the frame data and extract the state feature. The states of the associated virtual objects include at least one of positions, health points, attack power values, defense power values, empirical values, kill counts, death counts, or economic values of the associated virtual objects; and the states of the virtual resources include at least one of positions, health points, attack power values, defense power values, endurance values, or occupation states of the virtual resources.

In an optional embodiment, at least two virtual objects belong to at least two mutually hostile camps respectively; the virtual resource includes at least one of a building, a neutral creature, a troop, a means of transportation, a weapon, or ammunition; the occupation state includes a neutral state, a controlled state, an occupied state, or a contested state; the neutral state is used for representing that the virtual resource does not belong to any camp; the controlled state is used for representing that there is at least one virtual object belonging to the same camp within the movement region in which the virtual resource is located; the occupied state is used for representing a camp to which the virtual resource belongs; and the contested state is used for representing that there are at least two virtual objects belonging to different camps within the movement region in which the virtual resource is located.

In an optional embodiment, the value network prediction model is used for representing an expected-return rule that is obtained based on training of sample data sets, the sample data sets including: sample state features and actual returns corresponding to the sample state features.

The data obtaining module 1110 is further configured to obtain p pieces of sample frame data, p being a positive integer greater than or equal to 2.

The feature extraction module 1120 is further configured to perform feature extraction on the p pieces of sample frame data to obtain a sample state feature of each piece of sample frame data. The sample state feature includes the states of the associated virtual objects and the states of the virtual resources.

The reward extraction module 1160 is configured to calculate an actual return of each of p sample state features.

The machine learning training module 1170 is configured to: input the p sample state features into an original value network prediction model, to obtain a training result of each of the sample state features; for each sample data set, compare the training result with an actual return of the sample state feature, to obtain a calculation loss, the calculation loss being used for indicating an error between the training result and the actual return of the sample state feature; and obtain the value network prediction model through training by using an error back propagation algorithm according to respective calculation loss corresponding to at least one sample data set.

In an optional embodiment, the data obtaining module 1110 is further configured to obtain l pieces of historical frame data generated by the application program of the virtual environment during running, l being a positive integer greater than or equal to p.

The state sampling module 1180 is configured to extract l pieces of historical frame data according to a preset time step to obtain q pieces of candidate frame data, q being a positive integer, p≤q≤l; and read the q pieces of candidate frame data, and determine candidate frame data, which includes an attack behavior, in the q pieces of candidate frame data as the sample frame data, to obtain p pieces of sample frame data.

The reward extraction module 1160 is further configured to: calculate an instant reward of each sample state feature according to a behavior and a state of the target virtual object in the sample state feature; for an $i^{th}$ piece of sample frame data in the p pieces of sample frame data, calculate an actual return of the $i^{th}$ piece of sample frame data according to an instant reward of the $i^{th}$ piece of sample frame data and an instant reward of an $(i+1)^{th}$ piece of sample frame data, i being a positive integer less than or equal to p.

Figure 12:
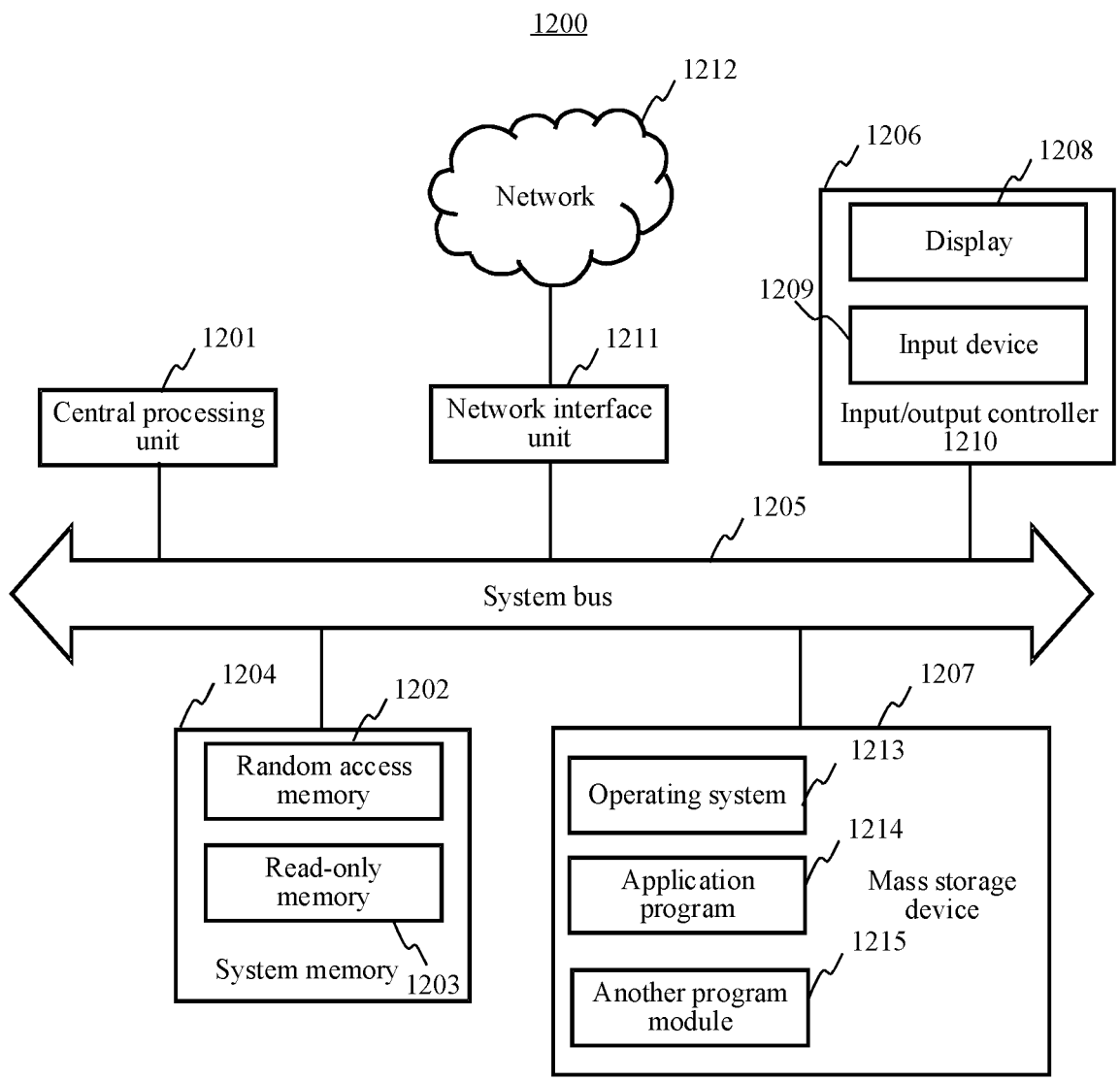
FIG. 12 is a structural block diagram of a computer device according to some exemplary embodiments of this application.

FIG. 12 is a schematic structural diagram of a computer device according to some exemplary embodiments of this application. The computer device may be the server 120 in the embodiment in FIG. 1. Specifically, the computer device 1200 includes a central processing unit (CPU) 1201, a system memory 1204 including a random access memory (RAM) 1202 and a read-only memory (ROM) 1203, and a system bus 1205 connecting the system memory 1204 and the CPU 1201. The computer device 1200 further includes a basic input/output (I/O) system 1206 assisting in transmitting information between components in a computer, and a mass storage device 1207 configured to store an operating system 1213, an application program 1214, and another program module 1215.

The basic I/O system 1206 includes a display 1208 configured to display information, and an input device 1209 used by a user to input information, such as a mouse or a keyboard. The display 1208 and the input device 1209 are both connected to the CPU 1201 by using an input/output controller 1210 connected to the system bus 1205. The basic I/O system 1206 may further include the input/output controller 1210, to receive and process inputs from a plurality of other devices, such as the keyboard, the mouse, or an electronic stylus. Similarly, the input/output controller 1210 further provides an output to a display screen, a printer, or another type of output device.

The mass storage device 1207 is connected to the CPU 1201 by using a mass storage controller (not shown) connected to the system bus 1205. The mass storage device 1207 and an associated computer-readable storage medium thereof provide non-transitory storage for the computer device 1200. That is, the mass storage device 1207 may include a computer-readable storage medium (not shown), such as a hard disk or a CD-ROM drive.

Without loss of generality, the computer-readable storage medium may include a computer storage medium and a communication medium. The computer storage medium includes volatile and non-transitory media, and removable and non-removable media implemented by using any method or technology used for storing information such as computer-readable instructions, data structures, program modules, or other data. The computer storage medium includes a RAM, a ROM, an EPROM, an EEPROM, a flash memory, or another solid-state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types. The system memory 1204 and the mass storage device 1207 may be collectively referred to as a memory.

The memory stores one or more programs. The one or more programs are configured to be executed by one or more CPUs 1201, and include instructions for implementing the foregoing method for scheduling virtual objects in a virtual environment. The CPU 1201 executes the one or more programs to implement the method for scheduling virtual objects in a virtual environment provided in the foregoing method embodiments.

According to the various embodiments of this application, the computer device 1200 may further be connected, through a network such as the Internet, to a remote computer on the network for running. That is, the computer device 1200 may be connected to a network 1212 by using a network interface unit 1211 connected to the system bus 1205, or may be connected to another type of network or a remote computer system (not shown) by using a network interface unit 1211.

The memory further includes one or more programs. The one or more programs are stored in the memory, and include steps performed by the computer device for implementing the method for scheduling virtual objects in a virtual environment provided in the embodiments of the present disclosure.

An embodiment of this application further provides a computer-readable storage medium, the storage medium storing at least one instruction, at least one program, a code set, or an instruction set, and the at least one instruction, the at least one program, the code set or the instruction set being loaded and executed by a processor to implement the method for scheduling virtual objects in a virtual environment according to any one of the foregoing embodiments.

This application further provides a computer program product, and the computer program product, when run on a computer, causes the computer to perform the method for scheduling virtual objects in a virtual environment according to the foregoing method embodiments.

"Plurality of" mentioned in the specification means two or more. "And/or" describes an association relationship for describing associated objects and represents that three relationships may exist. For example, A and/or B may represent the following three cases: only A exists, both A and B exist, and only B exists. The character "/" generally indicates an "or" relationship between the associated objects.

The sequence numbers of the foregoing embodiments of this application are merely for description purpose, and do not indicate the preference among the embodiments.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for scheduling virtual objects in a virtual environment performed by a computer device, the virtual environment comprising at least two virtual objects and virtual resources available to the virtual objects, the method comprising:

obtaining frame data generated by an application program associated with the virtual environment;

performing feature extraction on the frame data to obtain a state feature of a target virtual object in a current state, the state feature comprising states of associated virtual objects and the virtual resources, the associated virtual objects comprising the target virtual object and a virtual object having a relationship with the target virtual object;

performing deduction on the state feature of the target virtual object according to N scheduling policies, to obtain N subsequent state features, N being a positive integer greater than or equal to 2;

invoking a value network prediction model to process the N subsequent state features, to obtain expected returns of executing the N scheduling policies by the target virtual object; and selecting a target scheduling policy from the N scheduling policies according to the expected returns of the N scheduling policies, and controlling the target virtual object to execute the target scheduling policy.

2. The method according to claim 1, wherein a map of the virtual environment is divided into n movement regions, n being less than a number of pixels of the map, n being a positive integer greater than or equal to 2; and the performing deduction on the state feature according to N scheduling policies, to obtain N subsequent state features comprises:

obtaining m behaviors corresponding to the target virtual object, m being a positive integer greater than or equal to 1;

obtaining the N scheduling policies according to the m behaviors corresponding to the target virtual object and the n movement regions, each scheduling policy comprising moving to an $i^{th}$ movement region in the n movement regions to perform a $j^{th}$ behavior in the m behaviors, i and j being positive integers, $1 \leq i \leq n$, $1 \leq j \leq m$; and applying the N scheduling policies to the state feature of the target virtual object, and obtaining the N subsequent state features according to a preset state transition relationship, the state transition relationship being used for representing state changes of the state feature after the application of the scheduling policies.

3. The method according to claim 2, wherein the map is evenly divided into an array of the n movement regions; alternatively, the map is divided into the n movement regions according to positions of the virtual resources.

4. The method according to claim 3, wherein the performing feature extraction on the frame data to obtain a state feature of a target virtual object in a current state comprises:

extracting the state feature of the target virtual objects from current states of the associated virtual objects and current states of the virtual resources in the frame data;

the current states of the associated virtual objects comprise at least one of positions, health points, attack power values, defense power values, empirical values, kill counts, death counts, or economic values of the associated virtual objects, and the current states of the virtual resources comprise at least one of positions, health points, attack power values, defense power values, endurance values, or occupation states of the virtual resources.

5. The method according to claim 4, wherein the at least two virtual objects belong to at least two mutually hostile camps respectively;

the virtual resource comprises at least one of a building, a neutral creature, a troop, a means of transportation, a weapon, or ammunition;

the occupation state comprises a neutral state, a controlled state, an occupied state, or a contested state;

the neutral state is used for representing that the virtual resource does not belong to any camp;

the controlled state is used for representing that there is at least one virtual object belonging to the same camp within the movement region in which the virtual resource is located;

the occupied state is used for representing a camp to which the virtual resource belongs; and the contested state is used for representing that there are at least two virtual objects belonging to different camps within the movement region in which the virtual resource is located.

6. The method according to claim 1, wherein the value network prediction model is used for representing an expected-return rule that is obtained based on training of sample data sets, the sample data sets comprising: sample state features and actual returns corresponding to the sample state features; and before the invoking a value network prediction model to process the N subsequent state features, the method further comprises:

obtaining p pieces of sample frame data, p being a positive integer greater than or equal to 2;

performing feature extraction on the p pieces of sample frame data to obtain a sample state feature of each piece of sample frame data, the sample state feature comprising the states of the associated virtual objects, or states of the associated virtual objects and the virtual resources;

calculating an actual return of each of the p sample state features;

inputting the p sample state features into an original value network prediction model, to obtain a training result of the each sample state feature;

comparing, for each of the sample data sets, the training result with the actual return of the sample state feature, to obtain a calculation loss, the calculation loss being used for indicating an error between the training result and the actual return of the sample state feature; and obtaining the value network prediction model through training by using an error back propagation algorithm according to the respective calculation loss corresponding to the at least one sample data set.

7. The method according to claim 6, wherein the obtaining p pieces of sample frame data comprises:

obtaining l pieces of historical frame data generated by the application program of the virtual environment during running, l being a positive integer greater than or equal to p;

sampling the l pieces of historical frame data according to a preset time step, to obtain q pieces of candidate frame data, q being a positive integer, p≤q≤l; and reading the q pieces of candidate frame data, and determining candidate frame data, which comprises an attack behavior, in the q pieces of candidate frame data as the sample frame data, to obtain the p pieces of sample frame data.

8. The method according to claim 6, wherein the calculating an actual return of each of the p sample state features comprises:

calculating an instant reward of the each sample state feature according to a behavior and a state of the target virtual object in the sample state feature, the instant reward being a contribution of a change of the state, which is caused by the behavior, to a winning condition; and calculating, for an $i^{th}$ piece of sample frame data in the p pieces of sample frame data, an actual return of the $i^{th}$ piece of sample frame data according to an instant reward of the $i^{th}$ piece of sample frame data and an instant reward of an $(i+1)^{th}$ piece of sample frame data, i being a positive integer less than or equal to p.

9. The method according to claim 1, wherein the selecting a target scheduling policy from the N scheduling policies according to the expected returns of the N scheduling policies comprises:

choosing a scheduling policy having a highest expected return in the N scheduling policies as the target scheduling policy.

10. A computer device, comprising a memory and a processor, the memory storing computer-readable instructions, and the computer-readable instructions, when executed by the processor, causing the processor to perform a plurality of operations including:

obtaining frame data generated by an application program associated with the virtual environment;

performing feature extraction on the frame data to obtain a state feature of a target virtual object in a current state, the state feature comprising states of associated virtual objects and the virtual resources, the associated virtual objects comprising the target virtual object and a virtual object having a relationship with the target virtual object;

performing deduction on the state feature of the target virtual object according to N scheduling policies, to obtain N subsequent state features, N being a positive integer greater than or equal to 2;

invoking a value network prediction model to process the N subsequent state features, to obtain expected returns of executing the N scheduling policies by the target virtual object; and selecting a target scheduling policy from the N scheduling policies according to the expected returns of the N scheduling policies, and controlling the target virtual object to execute the target scheduling policy.

11. The computer device according to claim 10, wherein a map of the virtual environment is divided into n movement regions, n being less than a number of pixels of the map, n being a positive integer greater than or equal to 2; and the performing deduction on the state feature according to N scheduling policies, to obtain N subsequent state features comprises:

obtaining m behaviors corresponding to the target virtual object, m being a positive integer greater than or equal to 1;

obtaining the N scheduling policies according to the m behaviors corresponding to the target virtual object and the n movement regions, the each scheduling policy comprising moving to an $i^{th}$ movement region in the n movement regions to perform a $j^{th}$ behavior in the m behaviors, i and j being positive integers, 1≤i≤n, 1≤j≤m; and applying the N scheduling policies to the state feature of the target virtual object, and obtaining the N subsequent state features according to a preset state transition relationship, the state transition relationship being used for representing state changes of the state feature after the application of the scheduling policies.

12. The computer device according to claim 11, wherein the map is evenly divided into an array of the n movement regions; alternatively, the map is divided into the n movement regions according to positions of the virtual resources.

13. The computer device according to claim 12, wherein the performing feature extraction on the frame data to obtain a state feature of a target virtual object in a current state comprises:

extracting the state feature of the target virtual objects from current states of the associated virtual objects and current states of the virtual resources in the frame data;

the current states of the associated virtual objects comprise at least one of positions, health points, attack power values, defense power values, empirical values, kill counts, death counts, or economic values of the associated virtual objects, and the current states of the virtual resources comprise at least one of positions, health points, attack power values, defense power values, endurance values, or occupation states of the virtual resources.

14. The computer device according to claim 13, wherein the at least two virtual objects belong to at least two mutually hostile camps respectively;

the virtual resource comprises at least one of a building, a neutral creature, a troop, a means of transportation, a weapon, or ammunition;

the occupation state comprises a neutral state, a controlled state, an occupied state, or a contested state; the neutral state is used for representing that the virtual resource does not belong to any camp; the controlled state is used for representing that there is at least one virtual object belonging to the same camp within the movement region in which the virtual resource is located; the occupied state is used for representing a camp to which the virtual resource belongs; and the contested state is used for representing that there are at least two virtual objects belonging to different camps within the movement region in which the virtual resource is located.

15. The computer device according to claim 10, wherein the value network prediction model is used for representing an expected-return rule that is obtained based on training of sample data sets, the sample data sets comprising: sample state features and actual returns corresponding to the sample state features; and before the invoking a value network prediction model to process the N subsequent state features, the computer-readable instructions further cause the processor to perform the following operations:

obtaining p pieces of sample frame data, p being a positive integer greater than or equal to 2;

performing feature extraction on the p pieces of sample frame data to obtain a sample state feature of each piece of sample frame data, the sample state feature comprising the states of the associated virtual objects, or states of the associated virtual objects and the virtual resources;

calculating an actual return of each of the p sample state features;

inputting the p sample state features into an original value network prediction model, to obtain a training result of the each sample state feature;

comparing, for each of the sample data sets, the training result with the actual return of the sample state feature, to obtain a calculation loss, the calculation loss being used for indicating an error between the training result and the actual return of the sample state feature; and obtaining the value network prediction model through training by using an error back propagation algorithm according to the respective calculation loss corresponding to the at least one sample data set.

16. The computer device according to claim 15, wherein the obtaining p pieces of sample frame data comprises:

obtaining l pieces of historical frame data generated by the application program of the virtual environment during running, l being a positive integer greater than or equal to p;

sampling the l pieces of historical frame data according to a preset time step, to obtain q pieces of candidate frame data, q being a positive integer, p≤q≤l; and reading the q pieces of candidate frame data, and determining candidate frame data, which comprises an attack behavior, in the q pieces of candidate frame data as the sample frame data, to obtain the p pieces of sample frame data.

17. The computer device according to claim 15, wherein the calculating an actual return of each of the p sample state features comprises:

calculating an instant reward of the each sample state feature according to a behavior and a state of the target virtual object in the sample state feature, the instant reward being a contribution of a change of the state, which is caused by the behavior, to a winning condition; and calculating, for an $i^{th}$ piece of sample frame data in the p pieces of sample frame data, an actual return of the $i^{th}$ piece of sample frame data according to an instant reward of the $i^{th}$ piece of sample frame data and an instant reward of an $(i+1)^{th}$ piece of sample frame data, i being a positive integer less than or equal to p.

18. The computer device according to claim 10, wherein the selecting a target scheduling policy from the N scheduling policies according to the expected returns of the N scheduling policies comprises:

choosing a scheduling policy having a highest expected return in the N scheduling policies as the target scheduling policy.

19. One or more non-transitory storage media storing computer-readable instructions, the computer-readable instructions, when executed by one or more processors, causing the one or more processors to perform a plurality of operations including:

obtaining frame data generated by an application program associated with the virtual environment;

performing feature extraction on the frame data to obtain a state feature of a target virtual object in a current state, the state feature comprising states of associated virtual objects and the virtual resources, the associated virtual objects comprising the target virtual object and a virtual object having a relationship with the target virtual object;

performing deduction on the state feature of the target virtual object according to N scheduling policies, to obtain N subsequent state features, N being a positive integer greater than or equal to 2;

invoking a value network prediction model to process the N subsequent state features, to obtain expected returns of executing the N scheduling policies by the target virtual object; and selecting a target scheduling policy from the N scheduling policies according to the expected returns of the N scheduling policies, and controlling the target virtual object to execute the target scheduling policy.

20. The one or more non-transitory storage media according to claim 19, wherein the selecting a target scheduling policy from the N scheduling policies according to the expected returns of the N scheduling policies comprises:

choosing a scheduling policy having a highest expected return in the N scheduling policies as the target scheduling policy.

* * * * *